(12) United States Patent
Tice

(10) Patent No.: US 12,097,733 B2
(45) Date of Patent: Sep. 24, 2024

(54) AMPHIBIOUS VEHICLE

(71) Applicant: Poseidon Amphibworks Corporation, Miami, FL (US)

(72) Inventor: Steve E Tice, San Diego, CA (US)

(*) Notice: Subject to any disclaimer, the term of this patent is extended or adjusted under 35 U.S.C. 154(b) by 0 days.

(21) Appl. No.: 18/127,654

(22) Filed: Mar. 28, 2023

(65) Prior Publication Data

US 2023/0347699 A1    Nov. 2, 2023

Related U.S. Application Data

(60) Provisional application No. 63/324,623, filed on Mar. 28, 2022.

(51) Int. Cl.
*B60F 3/00* (2006.01)

(52) U.S. Cl.
CPC .......... *B60F 3/0038* (2013.01); *B60F 3/0015* (2013.01)

(58) Field of Classification Search
CPC ......... B60F 3/00; B60F 3/0038; B60F 3/0015
See application file for complete search history.

(56) References Cited

U.S. PATENT DOCUMENTS

| | | | |
|---|---|---|---|
| 4,182,256 A | 1/1980 | Scott | |
| 4,953,492 A * | 9/1990 | Duffty | B60F 3/0007 440/38 |
| 4,958,584 A | 9/1990 | Williamson | |
| 4,974,539 A * | 12/1990 | Duffty | B63B 1/26 244/214 |
| 6,840,825 B1 | 1/2005 | Messano | |
| 8,539,899 B2 | 9/2013 | Gimpel | |
| 8,986,056 B2 | 3/2015 | Neprud | |
| 10,597,118 B2 | 3/2020 | Montague | |
| 10,940,917 B2 | 3/2021 | Montague | |
| 2008/0176464 A1 | 7/2008 | Longdill | |
| 2010/0144220 A1 | 6/2010 | Bailey | |
| 2014/0004761 A1 | 1/2014 | Neprud | |
| 2016/0236527 A1 | 8/2016 | Gibbs | |
| 2019/0291863 A1 | 9/2019 | Lyasoff | |
| 2020/0317332 A1 | 10/2020 | Didey | |
| 2021/0139141 A1 | 5/2021 | St. Clair | |
| 2021/0331791 A1 | 10/2021 | Geuther | |

FOREIGN PATENT DOCUMENTS

| | | | |
|---|---|---|---|
| RU | 2737406 | 11/2020 | |
| WO | 2014100568 | 6/2014 | |
| WO | WO-2015098317 A1 * | 7/2015 | ............ B60F 3/0038 |
| WO | 2021142172 | 7/2021 | |
| WO | 2022010404 | 1/2022 | |

* cited by examiner

*Primary Examiner* — Stephen P Avila
(74) *Attorney, Agent, or Firm* — Enrique A. Monteagudo, Esq.

(57) ABSTRACT

Aspects of the present disclosure generally pertain to an amphibious vehicle (or amphibian) that is viable on land as well as on water. Aspects of the present disclosure more specifically are directed toward an amphibious vehicle that employs hydrofoils and other features, for example, for efficient cruising when in water. The amphibious vehicle may be embodied as a personal amphibious vehicle.

18 Claims, 21 Drawing Sheets

AMPHIBIOUS VEHICLE

CROSS-REFERENCE TO RELATED APPLICATION

This application claims priority to U.S. provisional patent application 63/324,623 filed Mar. 28, 2022 and entitled AMPHIBIOUS VEHICLE, the contents of all of which are incorporated herein by reference in their entirety.

BACKGROUND OF THE INVENTION

Technical Field

The present disclosure generally pertains to amphibious vehicles, and is more particularly directed towards an amphibious vehicle that is viable on land as well as on water.

Related Art

Land and water amphibious vehicles (sometimes called "amphibians") generally fall into two main categories: those that travel on an air-cushion (Hovercraft) and those that do not. Amongst the latter, many designs were prompted by the desire to expand the off-road capabilities of land-vehicles to an "all-terrain" ability. Many designs use tracks in addition to or instead of wheels, and in some cases even resort to articulated body configurations or other unconventional designs. Most land vehicles can be made amphibious simply by providing them with a waterproof hull and perhaps a propeller. For propulsion in or on the water some vehicles simply make do by spinning their wheels or tracks, while others can power their way forward more effectively using (additional) screw propeller(s) or water jet(s).

Most amphibians are designed as road vehicles that adapt to travel on relatively calm or protected waters. Although they may travel on water, they have many shortcomings when compared to similar sized boats. In particular, non-military and non-commercial amphibious road and water vehicles of the past and present are substantially lacking: in overall efficiency, low emissions powertrains, smooth riding characteristics in water, water to ramp power, and value proposition for their customers. That is, their feature set, energy efficiency and capabilities fall far short when compared to the purchase price that past and current manufacturers charge or have charged for these personally-owned vehicles.

Today's amphibious solutions in this area consist of pre-owned internal combustion engine (ICE) powered vehicles from companies either out of business or no longer selling these vehicles, or home built conversion vehicles built partially or completely by DYI'ers (Do It Yourselfers) and kit conversion companies. In most cases these vehicles are considered "specialty limited use" vehicles.

Due to the ICE type of propulsion these past and present vehicles use(d), all-wheel-drive (AWD), required for easy transition from/to land/sea; high efficiency distributed propulsion was not cost effective to implement nor were these engines easy to pass emissions around the world. In addition, large customer bases are required to justify a 4-wheel vehicle development which includes costly crash testing and related large development investments to become even street legal.

U.S. Pat. App. Pub. No. US 20160236527 by Gibbs, published on Aug. 18, 2016, shows an amphibian. There, the amphibian for use in land and marine modes comprises: a planing hull; three wheel stations, two of the three wheel stations being front wheel stations provided one on each side of and in the front half of the amphibian, and the third wheel station being a rear wheel station provided in a central region in the rear half of the amphibian; at least one wheel provided at each wheel station, each wheel being movable between a protracted land mode position and a retracted marine mode position; land propulsion means to propel the amphibian on land in the land mode, the land propulsion means comprising at least one of the wheels; and marine propulsion means to propel the amphibian on water in the marine mode, the marine propulsion means comprising at least two impellers or propellers provided one on each side of the rear wheel station.

U.S. Pat. No. 10,940,917 issued to Montague, et al. on Mar. 9, 2021, shows a watercraft device with hydrofoil and electric propeller system. There, a modular, weight-shift controlled watercraft device is disclosed which includes: a modular board removably attachable to a power system. The power system includes a modular power supply system, and a modular propulsion system. The power supply system includes a housing including a battery. The propulsion system includes a modular strut, a modular propulsion pod, and a modular hydrofoil. In one embodiment, the power supply system is removably and mechanically attachable directly to the propulsion system.

WIPO (PCT) Pat. App. Pub. No. WO 2022/010404 by Hasselskog, published on Jan. 13, 2022, shows a hydrofoil vessel. There, the hydrofoil vessel comprises a hydrofoil assembly, and a hull assembly presenting, when the vessel is floating at rest, a vertical symmetry plane, wherein the hydrofoil assembly comprises two struts extending from the hull assembly on opposite transverse sides of the symmetry plane, mainly downwards when the vessel is floating at rest, or mainly partly away from the symmetry plane and partly downwards when the vessel is floating at rest, wherein the hydrofoil assembly comprises two main foil portions each extending from a respective one of the struts, at least partly towards the symmetry plane, wherein each strut comprises a strut foil with a non-symmetrical cross-section, and with a pressure side facing at least partly towards the symmetry plane, and a suction side facing at least partly away from the symmetry plane.

The present disclosure is directed toward overcoming known problems and problems discovered by the inventor. Further, the present disclosure addresses deficiencies in performance in known watercraft.

SUMMARY OF THE DISCLOSURE

Aspects of the present disclosure generally pertain to an amphibious vehicle (or amphibian) that is viable on land as well as on water. Aspects of the present disclosure more specifically are directed toward an amphibious vehicle that employs hydrofoils and other features, for example, for efficient cruising when in water and more efficient road/land traction powertrains.

A personal amphibious vehicle for land and water transport is disclosed herein. The personal amphibious vehicle includes a chassis, a traction drive, a water drive, a forward lifting hydrofoil, an aft lifting hydrofoil, and a plurality of hydrofoil struts. The chassis includes a lower body, an upper portion, a forward portion, an aft portion, and a vehicle user interface, and is configured for land travel and as a watercraft. The traction drive is mounted to the chassis, and is configured to propel, stop, and steer the personal amphibious vehicle on land; the traction drive includes at least three road wheels. The water drive is mounted to the chassis, and is configured to propel and steer the personal amphibious vehicle in water; the water drive includes at least two water thrusters. The forward lifting hydrofoil is configured to lift the forward portion of the chassis while hydrofoiling. The aft lifting hydrofoil is configured to lift the aft portion of the chassis while hydrofoiling. The plurality of hydrofoil struts are each mounted to the chassis and to at least one of the forward lifting hydrofoil and the aft lifting hydrofoil, with each configured to dynamically transition between a deployed state and a stowed state; the deployed state being where at least one of the forward lifting foil and the aft lifting foil is positioned in an extended position below the lower body of the chassis, and the stowed state being where the at least one of the forward lifting foil and the aft lifting foil is positioned in a retracted position above the extended position, relative to chassis.

According to one embodiment an amphibious vehicle for land and water transport is disclosed herein. The amphibious vehicle includes a chassis, a traction drive, a water drive, a forward lifting hydrofoil, an aft lifting hydrofoil, and a plurality of hydrofoil struts. The chassis includes a lower body, an upper portion, a forward portion, an aft portion, and a vehicle user interface, and is configured for land travel and as a watercraft. The traction drive is mounted to the chassis, and is configured to propel, stop, and steer the amphibious vehicle on land. The water drive is mounted to the chassis, and is configured to propel and steer the amphibious vehicle in water; the water drive includes at least two water thrusters. The forward lifting hydrofoil is configured to lift the forward portion of the chassis while hydrofoiling. The aft lifting hydrofoil is configured to lift the aft portion of the chassis while hydrofoiling. The plurality of hydrofoil struts are each mounted to the chassis and to at least one of the forward lifting hydrofoil and the aft lifting hydrofoil, with each configured to dynamically transition between a deployed state and a stowed state; the deployed state being where at least one of the forward lifting foil and the aft lifting foil is positioned in an extended position below the lower body of the chassis, and the stowed state being where the at least one of the forward lifting foil and the aft lifting foil is positioned in a retracted position above the extended position, relative to chassis.

DETAILED DESCRIPTION

Figure 1:
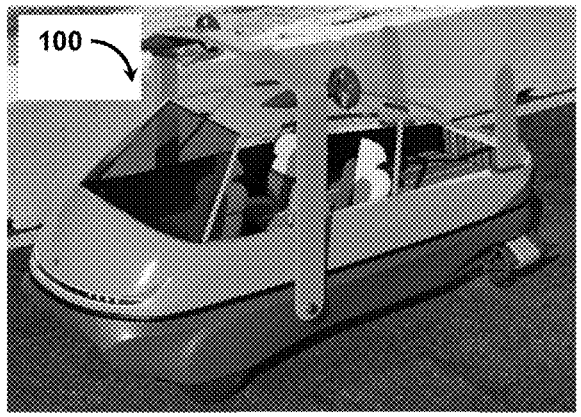
FIG. 1 is an upper front perspective view of an exemplary amphibious vehicle driving on land with its wheels deployed and with its hydrofoils stowed, specifically on a highway, according to one embodiment of the present disclosure.

Aspects of the present disclosure generally pertain to an amphibious vehicle (or "amphibian") that is viable on land as well as on water. Aspects of the present disclosure more specifically are directed toward an amphibious vehicle that employs hydrofoils and other features, for example, for efficient cruising when in water. Further, aspects of the present disclosure are directed at "small"/"compact" to "medium" size amphibious vehicles. "Small" size herein refers to powered amphibious vehicles less than 102 inches wide and between 6 feet in length and the maximum length allowed by roadway standards for small to medium SUVs (typically maximum 20 feet in length). Prior art amphibians are not designed or equipped for long distance, multi-day road or water travel, smooth water travel or moderate rough water conditions nor do they have sufficient capabilities to transition up boat ramps or dock or moor.

The disclosed amphibious hydrofoil enhanced vehicle embodiments may be powered optimally with distributed propulsion and, preferably, may include a chassis that includes a pair or three monohedron hulls. Further, the amphibious vehicle may be convertible between a highway-legal land vehicle, a watercraft that is capable of planing on the water in a low speed mode, and hydrofoil watercraft where the chassis/hulls are raised out of the water so only the foils and their connecting hydrofoil struts remain in the water in a high speed mode.

According to one exemplary embodiment, the amphibious vehicle may be embodied as a personal amphibious vehicle (e.g., capable of carrying between 1-5 people, etc.), enhanced with retractable hydrofoils, providing for improved cruise speed on the water, using less propulsion energy. However, the amphibious vehicle may be of any length/size rating, powered by any means, electric, internal combustion engine, jet, etc. For example, the amphibious vehicle may be embodied as a commercial transport amphibious vehicle (e.g., having a driver and compartment a cargo, passenger, etc.), having 4 or more wheels, tracks, and the like, or any combination thereof.

Additionally, the amphibious vehicle may incorporate a planing hull into the lower body or portion of the amphibious vehicle, which is configured to provide lift and reduce body drag as the amphibious vehicle gains velocity. Further, the lower body may be comprised of either a single "v shaped" hull, or a dual catamaran hull or trimaran hull, or a combination thereof. This may be particularly beneficial with regards to stowing the road interface of its traction drive. Thus, a streamlined amphibious vehicle is described herein, which may serve military or civilian purposes as a passenger or cargo carrying truck, limousine, bus, motor home or recreational vehicle on land, and extend those same functions on water, while matching the functionality and performance of similar length boats.

Preferably, the amphibious vehicle will drive on a minimum of 3 wheels to 4 wheels, however, any number of wheels may be used—particularly with larger or commercial/industrial/military vehicles. Notwithstanding, this disclosure will focus on a 3-wheel embodiment (aka "autocycle"), which is generally viewed as a "motorcycle" in many jurisdictions around the world, for purposes of legal classification and legal roadworthiness requirements. This may be advantageous to reduce development costs and accessibility to individuals and personal applications of the concepts disclosed herein.

Figure 2:
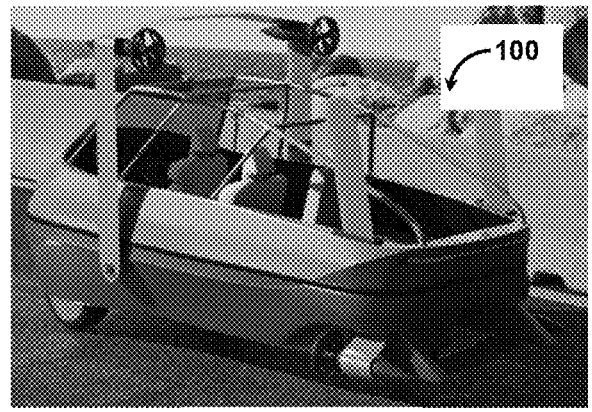
FIG. 2 is an upper back perspective view of the amphibious vehicle of FIG. 1, also driving on land.
Figure 3:
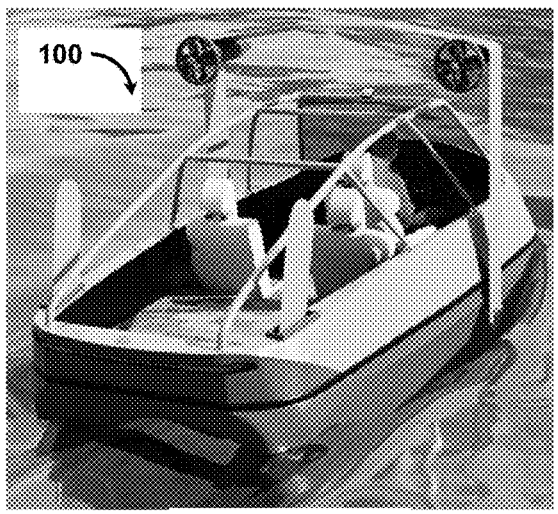
FIG. 3 is upper back perspective view of the amphibious vehicle of FIG. 1, while boating on water with its hydrofoils stowed, in a low speed mode, according to one embodiment of the present disclosure.
Figure 4:
FIG. 4 is an upper perspective view of the amphibious vehicle of FIG. 1 hydrofoiling in water, its high speed mode, according to one embodiment of the present disclosure.
Figure 5:
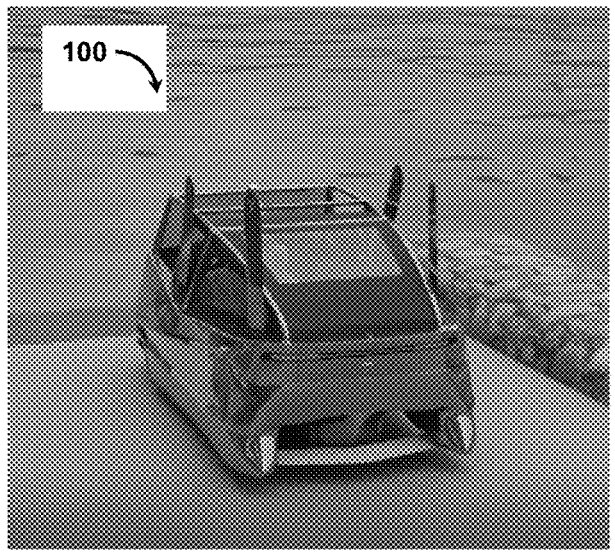
FIG. 5 is back perspective view of an exemplary amphibious vehicle driving from land to water as a land vehicle, with its wheels deployed and with its hydrofoils stowed, specifically on a boat ramp, according to another embodiment of the present disclosure.
Figure 6:
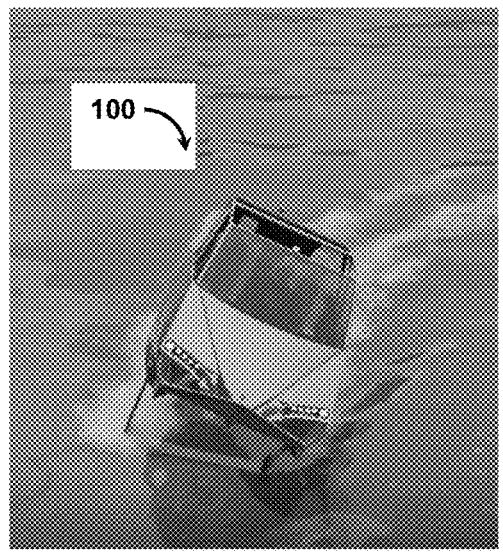
FIG. 6 is a front perspective view of the amphibious vehicle of FIG. 5 hydrofoiling in water through a high speed turn, according to one embodiment of the present disclosure.
Figure 7:
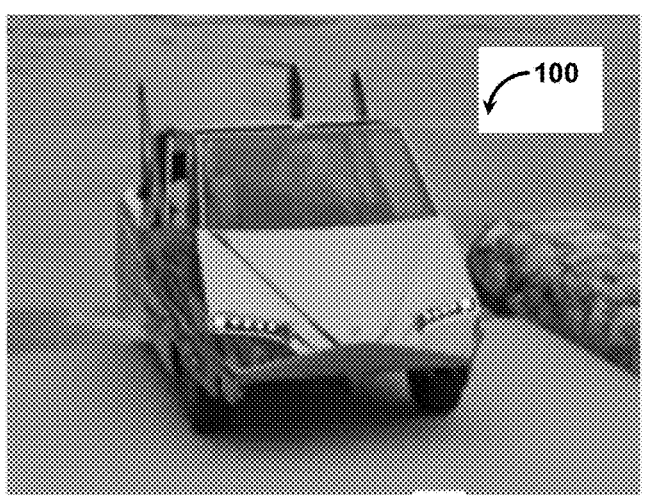
FIG. 7 is front perspective view of the amphibious vehicle of FIG. 5 driving out of water as a watercraft on to land and transitioning to a land vehicle, again with its wheels deployed and with its hydrofoils stowed.

FIGS. 1-7 are various views showing embodiment of the amphibious vehicle in various operational environments and in various different states and operation modes. In particular, FIG. 1 is an upper front perspective view of an exemplary amphibious vehicle 100 driving on land with its wheels deployed and with its hydrofoils stowed, specifically on a highway, according to one embodiment of the present disclosure. FIG. 2 is an upper back perspective view of the amphibious vehicle 100 of FIG. 1, also driving on land. FIG. 3 is upper back perspective view of the amphibious vehicle 100 of FIG. 1, while "boating" on water with both its wheels and hydrofoils stowed. FIG. 4 is an upper perspective view of the amphibious vehicle 100 of FIG. 1 raised up on its foils, hydrofoiling in water with its hydrofoils deployed. FIG. 5 is back perspective view of an exemplary amphibious vehicle 100 driving from land to water as a land vehicle, with its wheels deployed and with its hydrofoils stowed, specifically on a boat ramp, according to another embodiment of the present disclosure. FIG. 6 is a front perspective view of the amphibious vehicle 100 of FIG. 5 hydrofoiling in water through a high speed turn, according to one embodiment of the present disclosure. FIG. 7 is front perspective view of the amphibious vehicle 100 of FIG. 5 driving out of water as a watercraft on to land and transitioning to a land vehicle, again with its wheels deployed and with its hydrofoils stowed. For reference, the amphibious vehicle 100 defines commonly understood directions and sides, such as forward/bow and aft/stern, left/port and right/starboard, top/deck and bottom/hull relative to conventional land vehicles and watercraft, typically from a driver's/pilot's perspective.

Figure 8:
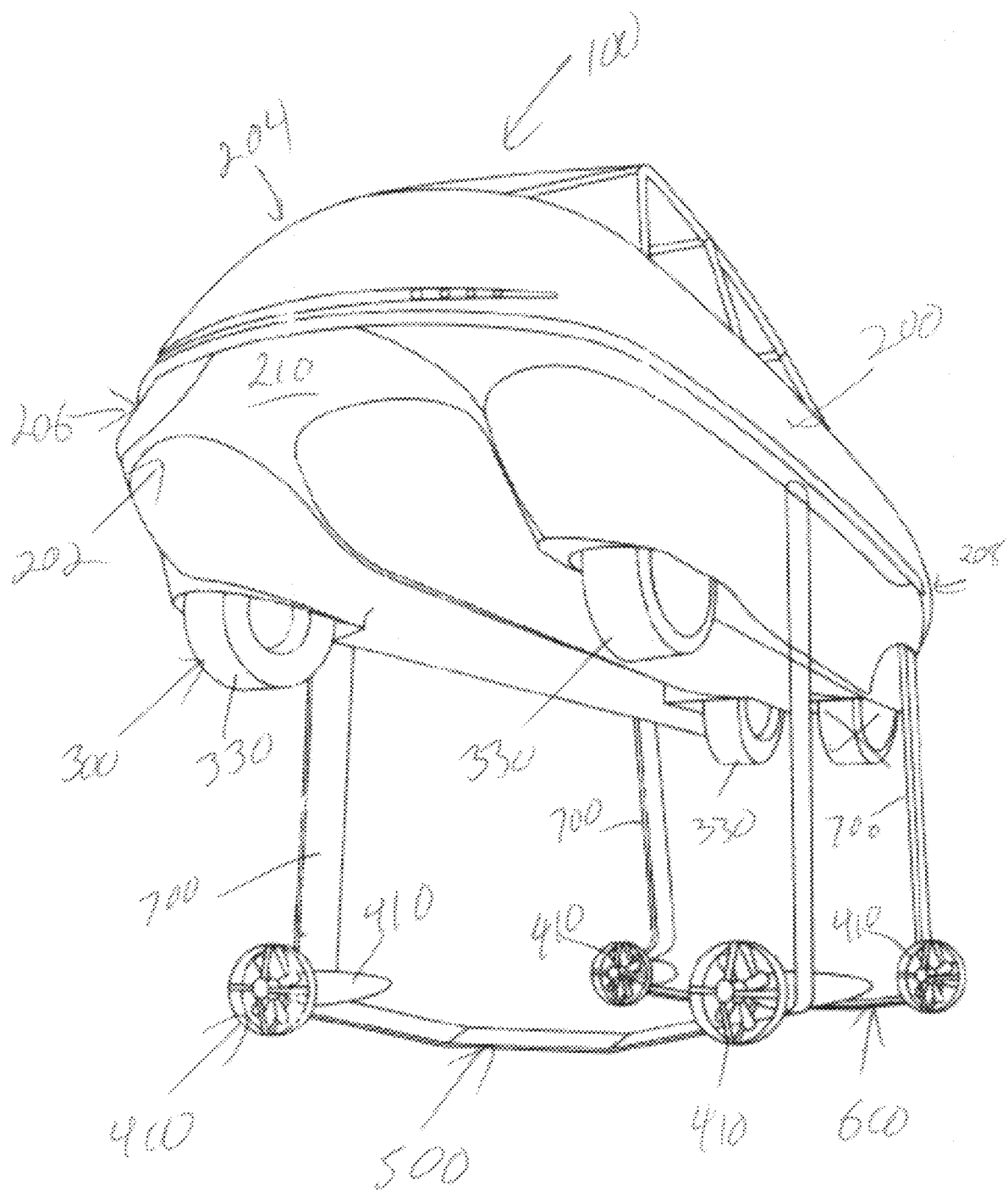
FIG. 8 is a lower perspective view of the amphibious vehicle lower hull of FIG. 1 with its hydrofoils deployed.

FIG. 8 is a lower perspective view of the amphibious vehicle of FIG. 1, with its hydrofoils deployed. As shown, an amphibious vehicle 100 may include a chassis 200, a traction drive 300 (e.g., electric or gas powered, etc.), a water drive 400, a forward lifting hydrofoil 500, an aft lifting hydrofoil 600, and a plurality of hydrofoil struts 700.

Figure 14A:
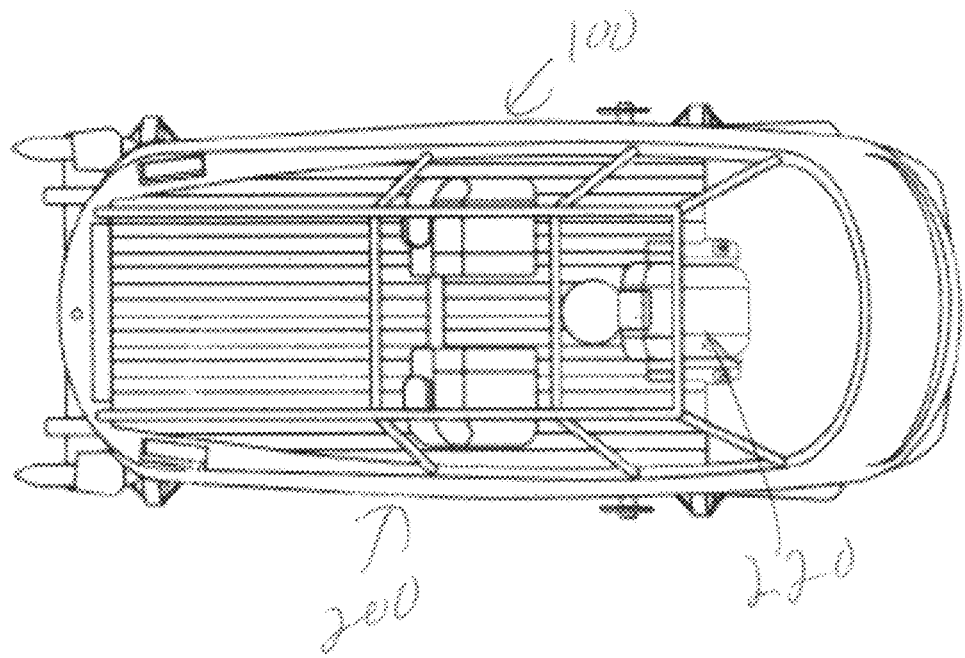
FIG. 14A is a top view of the amphibious vehicle of FIG. 1, with its hydrofoils deployed.
Figure 14B:
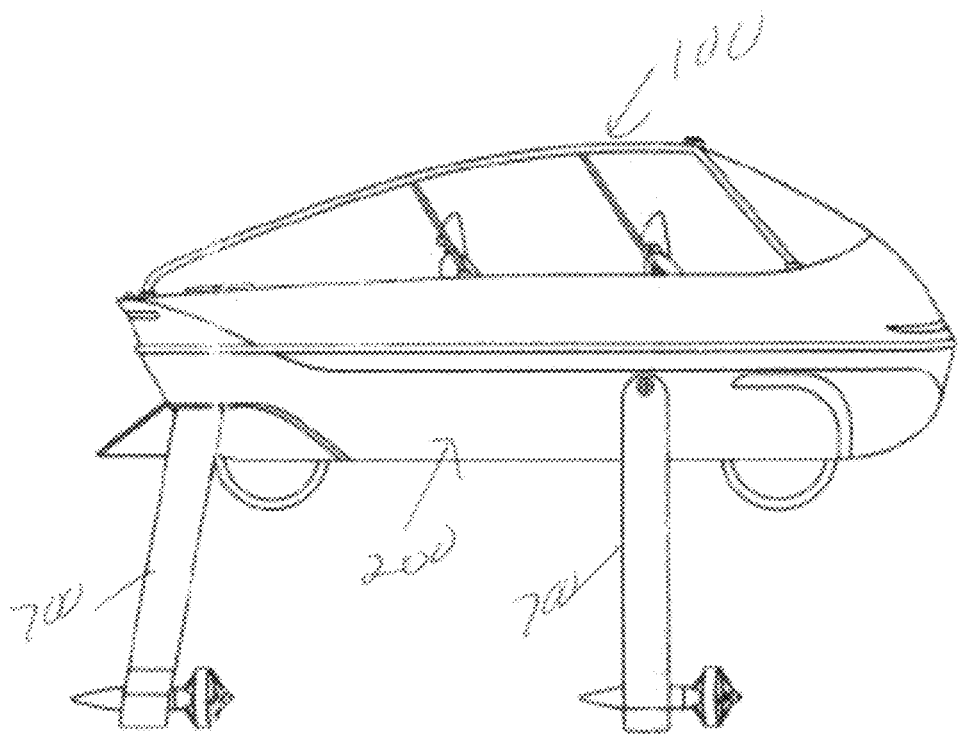
FIG. 14B is a side view of the amphibious vehicle of FIG. 1, with its hydrofoils deployed.
Figure 14C:
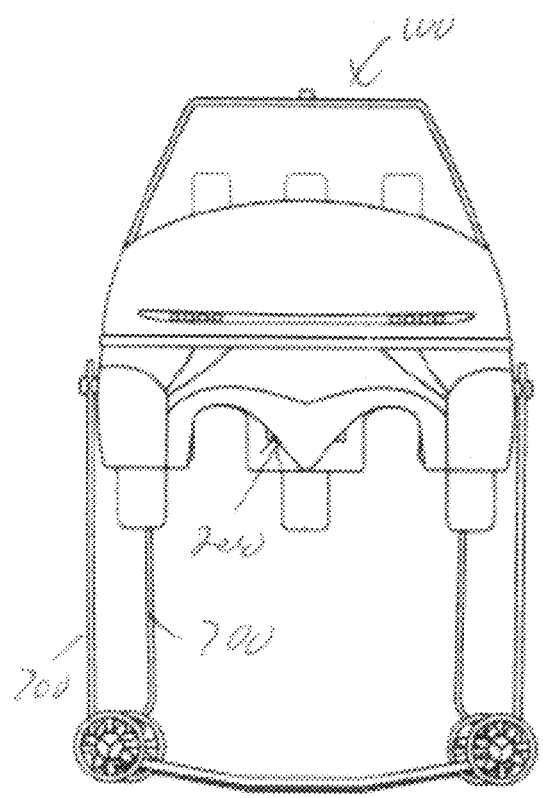
FIG. 14C is a front view of the amphibious vehicle of FIG. 1, with its hydrofoils deployed.
Figure 14D:
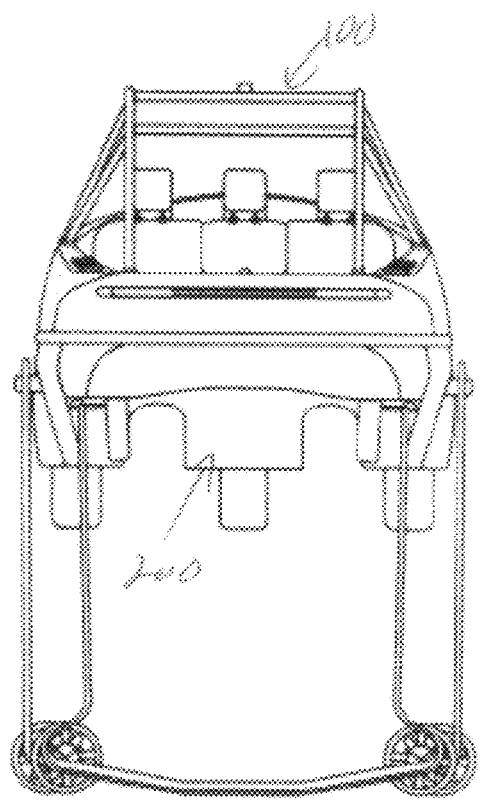
FIG. 14D is a back view of the amphibious vehicle of FIG. 1, with its hydrofoils deployed.
Figure 14E:
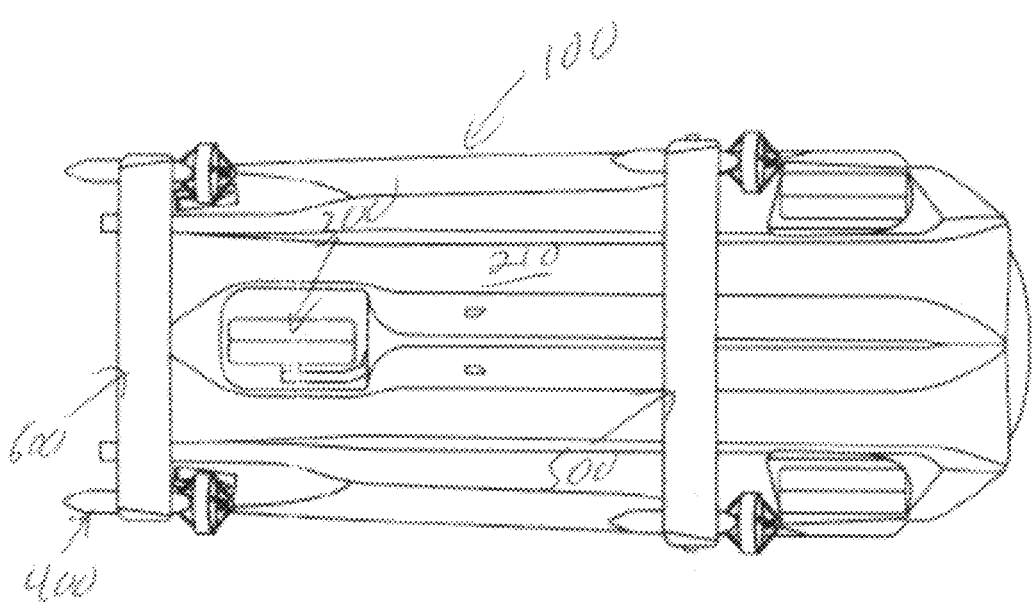
FIG. 14E is a bottom view of the amphibious vehicle of FIG. 1, with its hydrofoils deployed.
Figure 15A:
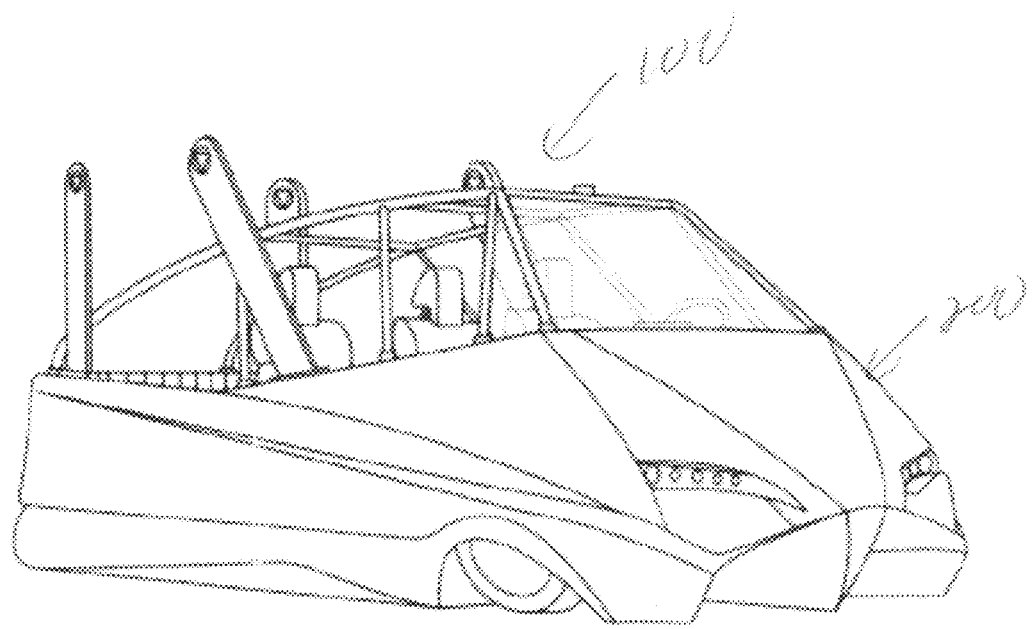
FIG. 15A is a perspective view of the amphibious vehicle of FIG. 15, with its wheels and hydrofoils stowed into the chassis, according to one exemplary embodiment of the present disclosure.
Figure 15B:
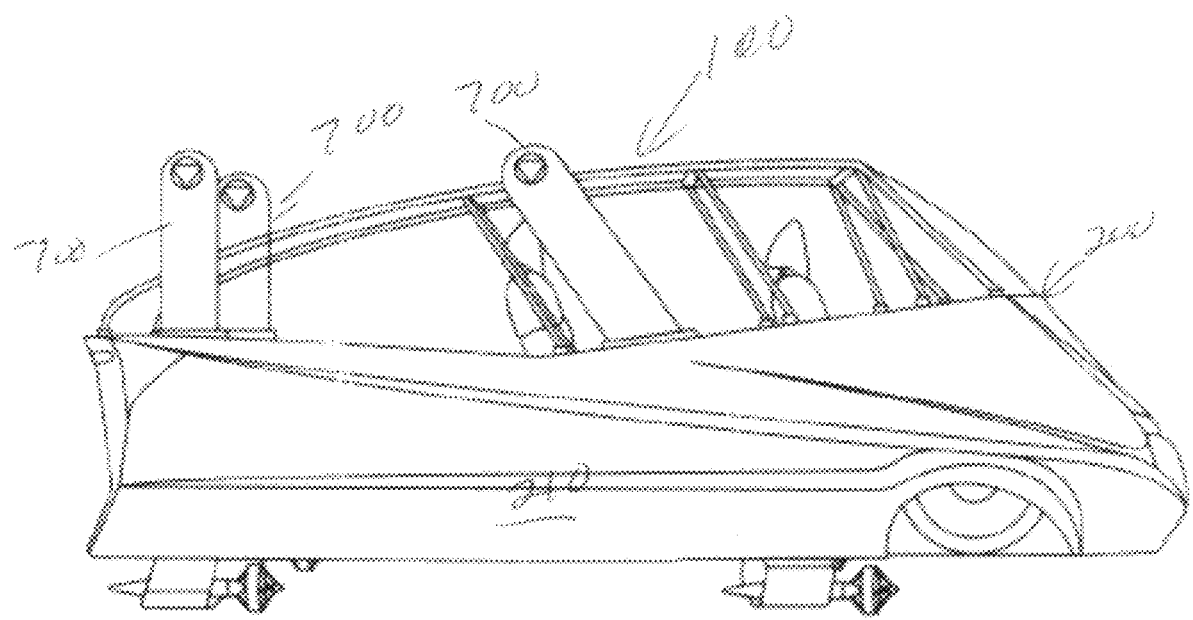
FIG. 15B is a side view of the amphibious vehicle of FIG. 5, with its wheels stowed and its hydrofoils partially deployed (boating mode), according to one exemplary embodiment of the present disclosure.
Figure 15C:
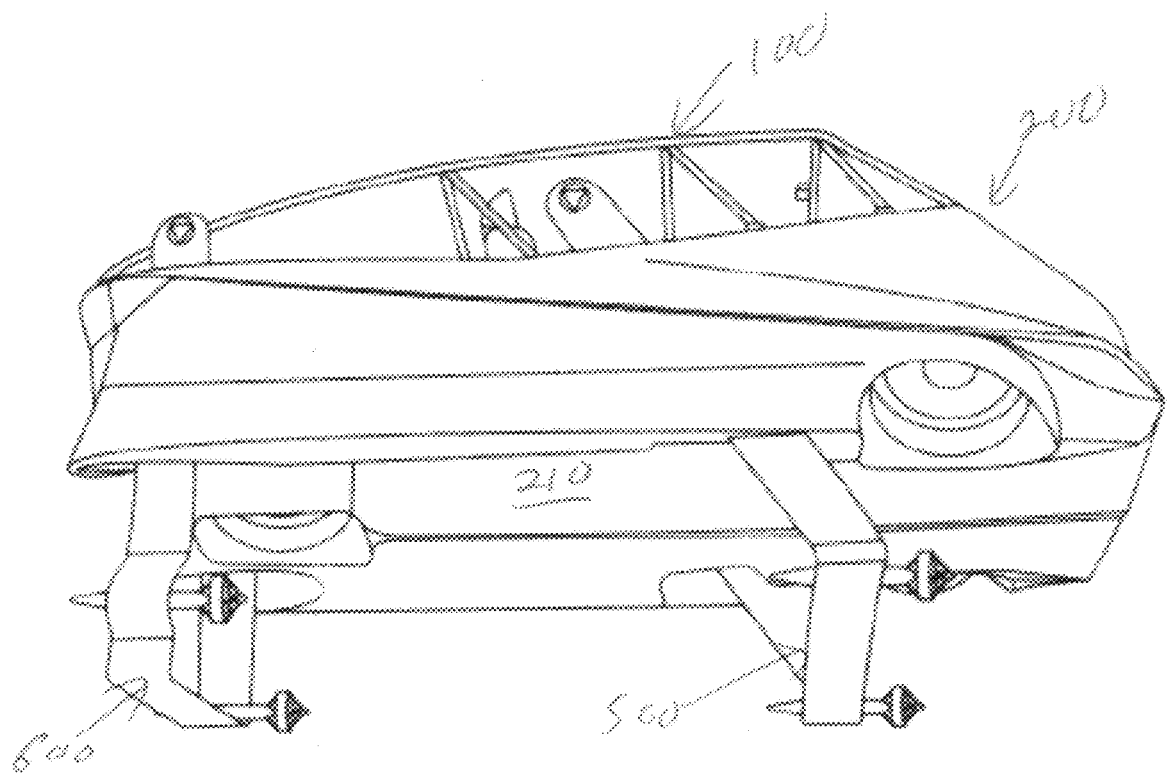
FIG. 15C is a bottom perspective view of the amphibious vehicle of FIG. 5, with its wheels stowed and its hydrofoils deployed (high speed mode), according to one exemplary embodiment of the present disclosure.
Figure 15D:
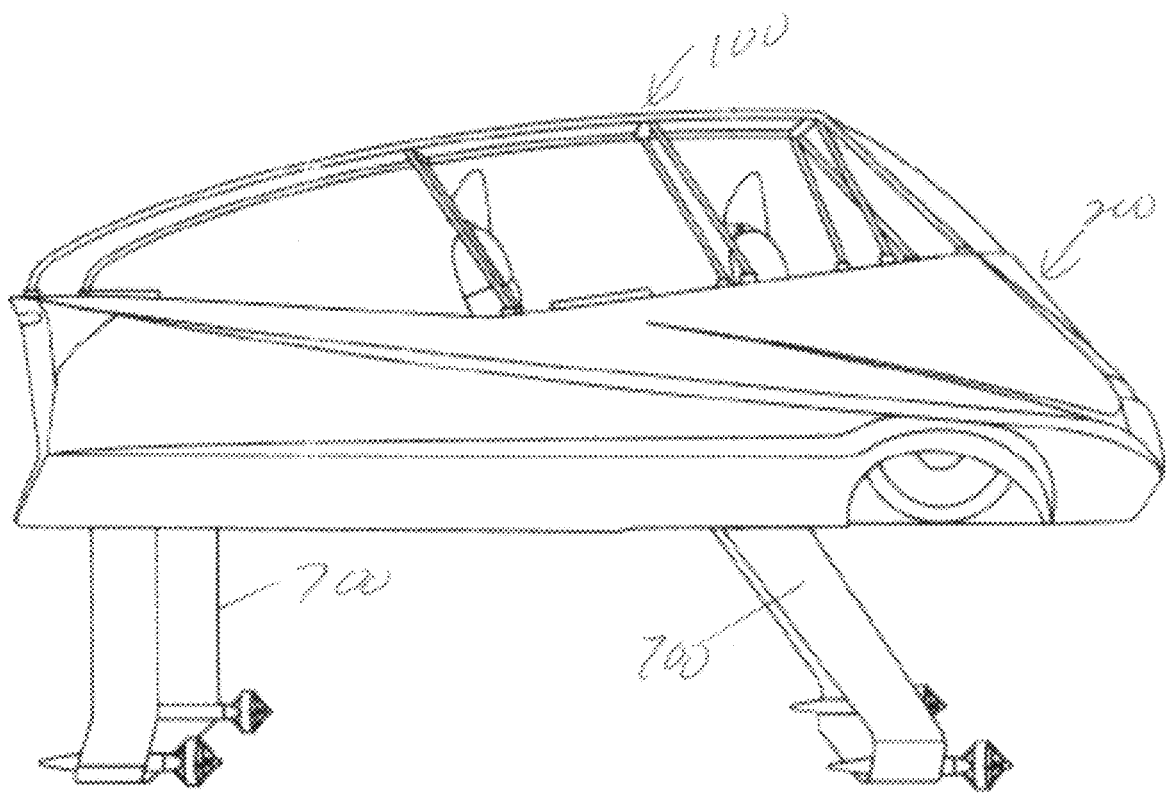
FIG. 15D is a side view of the amphibious vehicle of FIG. 5, with its wheels stowed and its hydrofoils deployed (high speed mode)

As illustrated, the chassis 200 (and thus the entire amphibious vehicle 100) may be configured for land travel and as a watercraft, and may generally include a lower portion 202, an upper portion 204, a forward portion 206, an aft portion 208, and a vehicle user interface 220 (see FIG. 14A). Preferably, the amphibious vehicle 100 (via the chassis 200) may be configured for land travel as a 3-wheel vehicle ("an autocycle"), or as a 4-wheel vehicle (see FIG. 9).

As an amphibious vehicle, the chassis 200 is configured to be viable on land as well as on water, providing appropriate buoyancy, structural support as is well-known with land vehicles and watercraft. Generally, the chassis 200 may include a hull or boat body 210 and is configured as the base structure to which the traction drive 300, the water drive 400, the forward lifting hydrofoil 500, the aft lifting hydrofoil 600, and the plurality of hydrofoil struts 700 are all physically coupled, directly and/or indirectly. Preferably, the chassis 200 (or portions thereof) may be made of a lightweight design, for example, using carbon composites, aluminum and construction techniques particular to the aviation industry.

With regard to roadworthiness and land operations, the chassis 200 of the amphibious vehicle 100 may preferably be sized similar to compact to mid-size vehicle (e.g., sized similar to an SUV or pickup truck and the like) of conventional vehicle height, width, and length restricted dimensions necessary to travel on highways and roads. According to one embodiment, the chassis 200 may have a "footprint" of approximately 7 feet wide by 16 feet long. Further, the chassis 200 may generally support or otherwise include standard car/truck driver features and controls for land/road (including road, highway, and/or off-road driving) operation of the amphibious vehicle 100.

With regard to seaworthiness and water operations, the chassis 200 may generally include standard boat features and controls of watercraft. Further, the bottom of the chassis 200 or the hull may be configured as a pontoon hull. In particular, the hull may be configured as catamaran (e.g., including dual pontoons or dual sponsons) or a trimaran (e.g., including 3 pontoons or 3 sponsons). Preferably, and as shown, the boat body 210 of the chassis 200 will be configured as a trimaran when in a 3-wheel arrangement, or as a catamaran when in a 4-wheel arrangement (see FIG. 9).

As illustrated, the traction drive 300 may be mounted to or otherwise supported by the chassis 200, and may be generally configured to propel, stop, and steer the amphibious vehicle 100 on land. The traction drive 300 may include a plurality of road wheels 330. Preferably, the amphibious vehicle 100 may include three road wheels 330 (as shown) or four road wheels 330 (see FIG. 9). This is particularly preferable when configured as a personal amphibious vehicle. Alternately, the amphibious vehicle 100 may include other ground interfacing means (e.g., 4 or more wheels, tracks, and the like, or any combination thereof—not shown). This is may be preferable when configured for larger payloads or commercial/industrial, non-personal use.

As illustrated, the water drive 400 may be mounted to or otherwise supported by the chassis 200, and may be generally configured to propel and steer the amphibious vehicle 100 in water. The water drive 400 may at least two water thrusters such as electric water thrusters 410. Preferably, the electric water thrusters 410 may be ducted and individually controllable. Further, the electric water thrusters 410 may be articulable or otherwise directional (e.g., gimbaled, directional nozzle, etc.). Other conventional water thrusters, such as open propellers, are contemplated as well, not to mention and conventional propulsion power means (e.g., hydraulic, mechanical, pneumatic, etc.).

As illustrated, the plurality of hydrofoil struts 700 may each be mounted to the chassis 200 and to at least one of the forward lifting hydrofoil 500 and the aft lifting hydrofoil 600, and together be configured to support the chassis 200 above a water surface when hydrofoiling. In particular, the forward lifting hydrofoil 500 may be configured to lift the forward portion 206 of the chassis 200 while hydrofoiling, and the aft lifting hydrofoil 600 may be configured to lift the aft portion 208 of the chassis 200 while hydrofoiling.

According to one embodiment, the plurality of hydrofoil struts 700 may each be configured to dynamically transition between a stowed state (shown in FIGS. 1-3, 5, and 7) and a deployed state (shown here and also in FIGS. 4 and 6). As shown, the deployed state of one hydrofoil strut 700 may be understood as being where its respective forward lifting foil 500 and/or aft lifting foil 600 is positioned in an extended position below the lower portion 204 of the chassis 200 (e.g., extending into the water, below the road wheel's lowest point). In some embodiments, the plurality of hydrofoil struts 700 may be configured in a partially deployed state.

Similarly, the stowed state of one hydrofoil strut 700 may be understood as being where its respective forward lifting foil 500 and/or aft lifting foil 600 is positioned in a retracted position above its extended position, relative to chassis 200. As shown in FIGS. 1-3, 5, and 7, the stowed state will preferably position the forward lifting foil 500 and/or the aft lifting foil 600 away from a road surface (e.g., proximate the chassis 200, inside the chassis 200, above the chassis 200, etc.). Likewise, the stowed state will preferably position as electric water thrusters 410 away from a road surface (e.g., proximate the chassis 200, inside the chassis 200, above, the chassis 200, etc.).

Advantageously, the addition of hydrofoils may greatly improve the performance of the amphibious vehicle 100 beyond existing amphibians (particularly as a 3-wheel Autocycle), being not only amphibious but also "hydrofoil enhanced". In particular, the amphibious vehicle 100 may boat on water with its hydrofoils stowed in a low speed or "boating" mode, similar to other amphibians. However, and in addition, the amphibious vehicle 100 may hydrofoil on water with its hydrofoils deployed in a high speed or "hydrofoiling" mode, greatly reducing drag and increasing efficiency. In both the 3-wheel and 4-wheel vehicle embodiments, the amphibious vehicle 100 may generally include dual or tri short draft hulls, from which hydrofoils and drive wheels may extend.

As above, by configuring the amphibious vehicle 100 as an autocycle (i.e., 3-wheeled), it may be legally classified with, or similar to, motorcycles. As such, the amphibious vehicle 100 may advantageously be subject to less stringent performance and legal requirements (e.g., emissions, crash, equipment, etc.), and thus may be easier and less costly to manufacture. Further, autocycles may beneficially provide for legal use on roadways, but require even less development cost and enhanced performance, due to reduced weight and complexity associated with 4th wheel.

Figure 9:
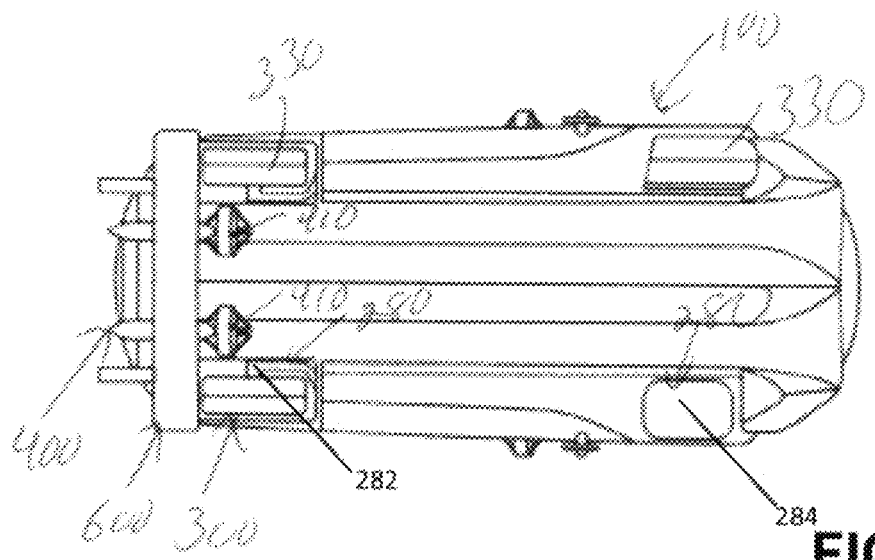
FIG. 9 is a bottom view of an amphibious vehicle, with its hydrofoils stowed and showing an alternate 4-wheel configuration, according to another exemplary embodiment of the present disclosure.
Figure 10A:
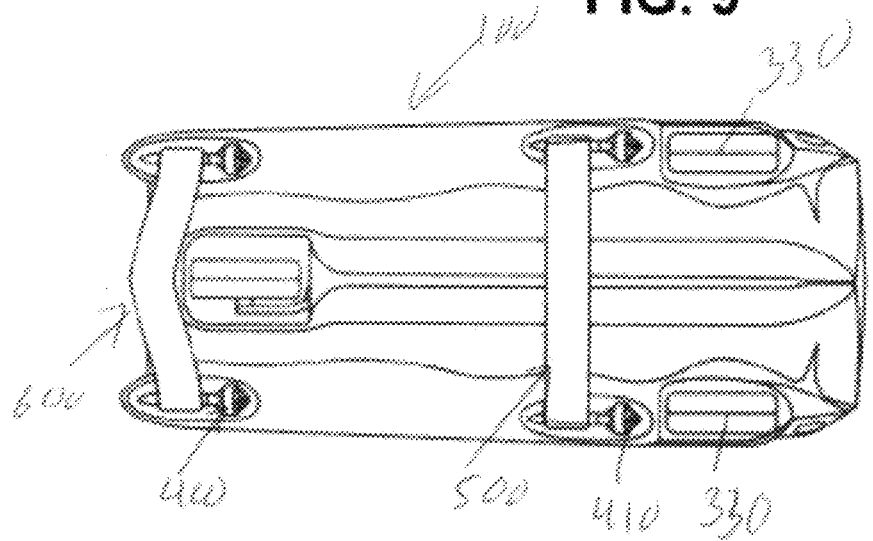
FIG. 10A is a bottom view of the amphibious vehicle of FIG. 5, with its two hydrofoils and three wheels stowed, according to one embodiment of the present disclosure.
Figure 10B:
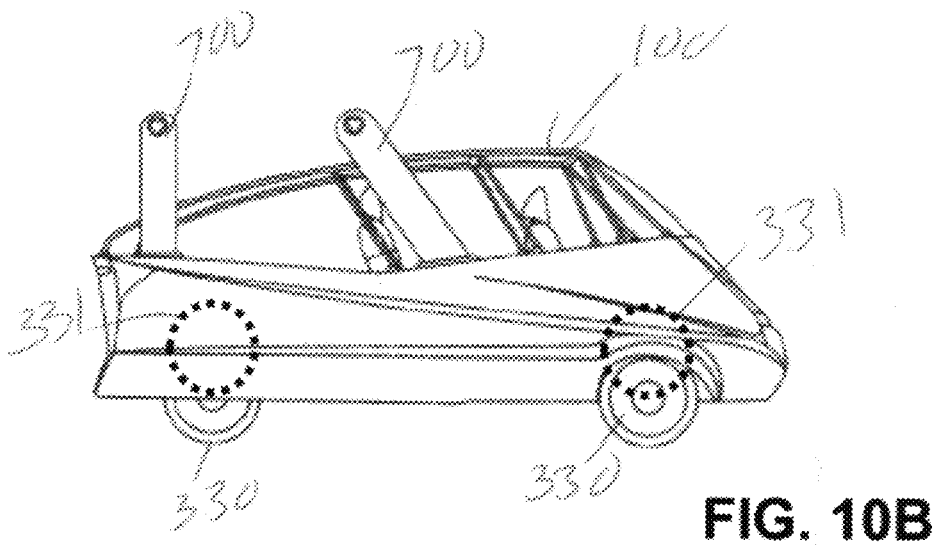
FIG. 10B is a cutaway side view of the amphibious vehicle of FIG. 5, with its two hydrofoils stowed, and also with its three wheels deployed from the stowed position as marked, according to one embodiment of the present disclosure.

FIG. 9 is a bottom view of an amphibious vehicle, with its hydrofoils stowed and showing an alternate 4-wheel configuration, according to another exemplary embodiment of the present disclosure. Here, for reference, the amphibious vehicle is shown in both doorless (see Right Front wheel) and, alternately, doored (see Left Front wheel) embodiments. FIG. 10A is a bottom view of the amphibious vehicle of FIG. 5, with its two hydrofoils and three wheels stowed, according to one embodiment of the present disclosure. FIG. 10B is a cutaway side view of the amphibious vehicle of FIG. 5, with its two hydrofoils stowed, and also with its three wheels deployed from the stowed position as marked 331, according to one embodiment of the present disclosure. As above, and by definition, the amphibious vehicle 100 may be configured for land travel and also as a watercraft. In particular, the amphibious vehicle 100 may transition between a land travel state and a watercraft state. The land travel state is generally understood to be where the road wheels 330 are configured to be direct contact with the ground/road and support the chassis 200 over land. Likewise, the watercraft state is generally understood to be where the chassis 200 is configured to be buoyant on water and thus support the amphibious vehicle 100 on water.

According to one embodiment, the traction drive 300 may be configured to dynamically transition between the land travel state and the watercraft state. In particular and as shown, the road wheels 330 of the traction drive 300 may be at least partially retracted into the chassis 200 in the watercraft state. For example and as illustrated, the amphibious vehicle 100 may raise, or otherwise stow its road wheels 330 (e.g., into the chassis 200). This may be particularly beneficial in reducing parasitic drag in the low speed or "boating" mode.

According to one embodiment, the chassis 200 of the amphibious vehicle 100 may further include a wheel stowage system 280 configured to retract the road wheels 330 at least partially into the hull (e.g., vertically, rotatably, completely, partially, etc.). In this way, the amphibious vehicle 100 may stow the road wheels 330 of the traction drive 300 as the chassis 200 achieves buoyancy, i.e., when road wheels 330 no longer touch the ground under water, under water or otherwise carry load, for example.

Further, the wheel stowage system 280 may include a wheel retractor 282 configured to stow the wheels during water operation. In particular, wheel retractor 282 may employ any conventional means for stowing the wheels, then relocate or otherwise reposition the road wheels 330 between a stowed position and at least one deployed position. For example, the wheel retractor 282 may be dynamically coupled to the road wheels 330 (e.g., via a linkage, shaft, arm, etc.), which is actuated electrically, pneumatically, hydraulically, mechanically, magnetically, or otherwise, to reposition the road wheels 330 between the stowed position and at least one deployed position (discussed further below). As above, this may reduce drag while the vehicle is in a low-speed water mode (i.e., "boating" while not on foils, but rather riding on its hull in the water), but may also provide for quicker take off to a hydrofoiling mode. In contrast, when the amphibious vehicle 100 is hydrofoiling, the road wheels 330 will be above the water entirely.

According to one embodiment, the amphibious vehicle 100 may be further configured to go "slick" when the road wheels 330 are stowed. In particular, the wheel stowage system 280 may further include any conventional actuated stowage door 284 (see FIG. 9, Left front wheel area) configured to cover all or a portion of the road wheels 330 when they are stowed. For example, and similar aircraft landing gear doors, the actuated stowage door 284 may be repositioned into a shut position after the road wheels 330 are stowed. Preferably, the actuated stowage door 284 will have a drag-minimizing wet surface, and will preferably seal or at least inhibit water ingress during boating mode.

As above, the disclosed amphibious vehicle 100 may also provide for a high speed or "hydrofoiling" mode, where the chassis 200 (and road wheels 330, stowed or otherwise) is completely (or at least partially) raised out of the water, minimizing parasite drag. In its enhanced or "high speed" mode, the hydrofoils are deployed into the water, and at relatively low speed the chassis 200 is raised out of the water. In other words, it should be understood the actuated stowage door 284 is most beneficial during a boating mode and/or a transition to a hydrofoiling mode, as once the amphibious vehicle 100 is hydrofoiling, the road wheels 330 may remain above the water level.

According to one embodiment, the wheel stowage system 280 may be operable to raise and lower the road wheels 330 not only during water operations, but also during land operations. In particular, in addition to stowing the wheels during water operations, the wheel stowage system 280 may be operable (e.g., by the driver) to adjust ride height for various reasons. For example, a lower ride height may be set for better aerodynamics on the highway, whereas a higher ride height may be set for rough roads and/or going up and down boat ramps for bodies of water. To illustrate, the traction drive 300 may be further configured to fix at least two of the at least three road wheels 330 into a plurality of distances or heights from the chassis 200, thus raising or lowering the ride, attitude, and/or tilt of the chassis 200 during land operations. This may be performed dynamically during driving, or more statically set when the vehicle is stopped.

According to one preferable embodiment, the wheel stowage system 280 may be integrated with the suspension system of the road wheels 330 (i.e., the wheel's mounting or physical couple to the chassis 200). Further, full suspension function may be maintained at any ride height (e.g., as selected by the driver or automatically selected by a vehicle controller of the amphibious vehicle 100). Advantageously, by using dynamic and/or integrated suspension to also provide wheel stowage during water operations, the wheel stowage system 280 may provide superior performance over traditional wheel retract systems on existing amphibious vehicles, as their systems cannot be used for adjusting ride height in road/land mode.

Further, and as discussed below, features may be included in the chassis 200 that will assist the transition from the boating mode to the hydrofoiling mode. In particular, hull features may be added that specifically lift the hull out of the water at a lower speed than current state-of-the-art electric hydrofoils. For example, hydrofoil surfboards typically have flat bottoms, which provide additional stability on the water's surface when surfing. Here however, the various hull features disclosed here may aggregate to dramatically reduce drag, and thus increase boating range of the vehicle when compared to prior art.

Referring now to FIGS. 8-10B, 13C-13E and 14C-14E, the bottom of the chassis 200 may have an optimally shaped trimaran (or catamaran hull—FIG. 4), with chines configured to lower the speed the hull will rise out of water (e.g., to plane at a relatively low speed), forming a fast planing, ground effects cathedral type double- or triple-tunnel hull. These may be coordinated with the hydrofoils 500, 600. For example, the amphibious vehicle 100 may incorporate "short takeoff" hydrofoils 500, 600 for optimal efficiency in high speed water operation, while the chassis 200 catamaran or trimaran hull for low speed water operations.

According to one embodiment, the hull or boat body 210 of chassis 200 may be configured to make use of a dynamic air cushion to augment the planing of the hulls, owing to the "ground" (water surface) "wing in ground effect" created by compression of the ram air stream (and water vapor) rushing through the one or two tapered tunnels separating the two-three hulls. In particular, the boat body 210 may include a continuous reveal on the hull bottom from bow to transom that separates two or three asymmetric hulls. This hull tunnel may be configured to both enhance sea stability and maneuverability, and create lift that helps the hull achieve plane and attain higher water speeds in a shorter distance.

Figure 11A:
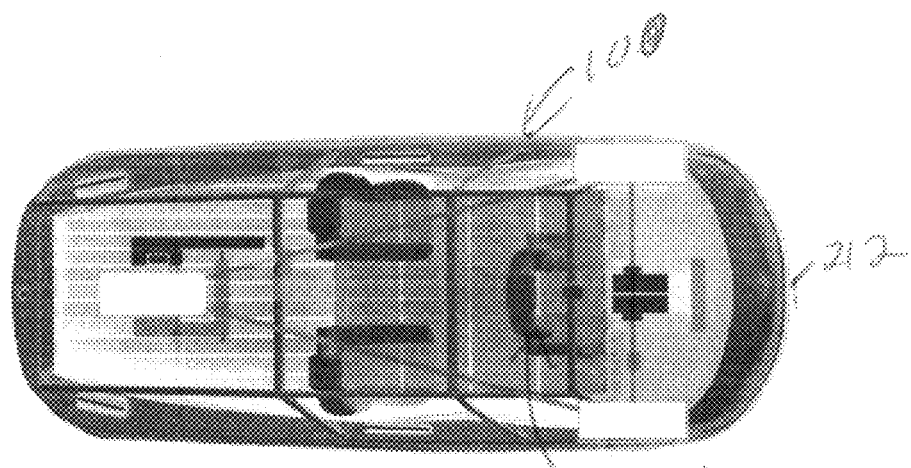
FIG. 11A is a cutaway top view of the amphibious vehicle of FIG. 1, exposing portions of the traction drive 300, according to one embodiment of the present disclosure.
Figure 11B:
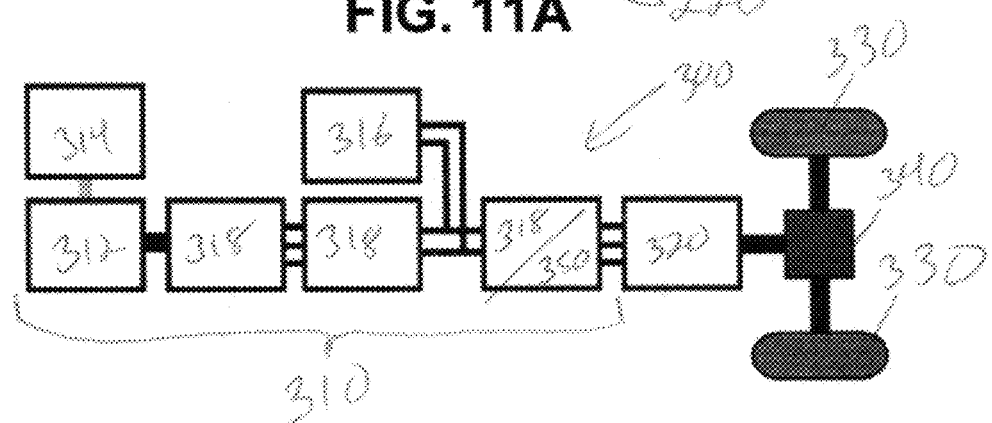
FIG. 11B is a schematic diagram of a series hybrid traction drive of an amphibious vehicle, according to one exemplary embodiment of the present disclosure.

FIG. 11A is a cutaway top view of the amphibious vehicle of FIG. 1, exposing portions of the traction drive 300, according to one embodiment of the present disclosure. FIG. 11B is a schematic diagram of a series hybrid traction drive of an amphibious vehicle, according to one exemplary embodiment of the present disclosure. As above, the amphibious vehicle 100 is propelled on land via the traction drive 300. Further, the traction drive 300 may include standard drive elements such as an energy supply 310 (consumable fuel and/or energy storage), a drive motor 320 (e.g., electric, gas, etc.), and a plurality of road wheels 330 (e.g., 3, 4, or more). As is well-known in the art, the drive motor 320 (energized by the energy supply 310) may drive or otherwise power the road wheels 330 directly (e.g., via built-in wheel motors) and/or indirectly (e.g., via a transmission 340).

According to one embodiment, and as shown, the traction drive 300 may be generally configured as a conventional series hybrid electric drive, where the engine 312 would run at optimum RPM for lowest fuel consumption, and with no connection to the wheels 330. In particular, the drive motor 320 may be an electric motor configured to apply torque to one or more of the road wheels 330 (e.g., directly or via a transfer case or other transmission component), and the energy supply 310 may include an engine 312 (e.g., internal combustion engine (ICE), fuel cell, solar, etc.) fed by a fuel tank 314, an electric energy storage 316 (e.g., batteries, supercapacitors, etc.), and any appropriate power electronics 318 (e.g., generator, charger, converters, relays, conductors, controllers, and the like), as are well known in the art. Similarly, the traction drive 300 may be arranged as a parallel hybrid electric drive, an electric/battery electric drive, and the like).

Preferably, and as above, the traction drive 300 may be arranged as a series plugin hybrid variation, where the energy supply 310 is configured as a modular plug'n play unit consisting of a constant RPM low emissions, high efficiency ICE and high voltage generator, supplying power directly to the propulsion system battery. As such, the electric energy storage 316 may be supplemented by what is essentially a compact, range extender plug in unit. Advantageously, this may deliver substantially more power per cubic foot and per lb. weight than batteries alone. The modular constant RPM ICE high voltage generator may afford the lowest emissions, highest efficiency in a vehicle range extender, allowing the vehicle to be used for longer range applications. Further, this will provide greater flexibility for replenishing the energy supply 310, particularly when on water. Thus, the very compact power generator expands range substantially beyond what adding batteries of the same volume and weight, hence giving the customer the lowest cost, smallest and lightest method to temporarily add range when needed.

According to one embodiment, the amphibious vehicle 100 may be flat-towable, meaning another vehicle can tow this vehicle on the road with all of its wheels on the ground (i.e., no trailer required). In particular, the chassis 200 may include one or more tow points 212, and components of the traction drive 300 may be decouplable from the road wheels 330, so as to be freewheeling. For example, the chassis 200 may include a standard flat tow hitch configured to be attached (to a towing vehicle) to tow the amphibious vehicle 100. Also, for example, the road wheels may be disengaged mechanically (e.g., via hub locks) when mechanically driven.

According to one embodiment, the drive motor 320 of the traction drive 300 may be electrically disengageable. In particular, the traction drive 300 may be configured such that any road wheel 330 in contact with the ground during towing may be electrically disengaged. For example, where there is just one drive motor 320, it may be an inductive motor. Also for example, where one or more road wheels 330 are individually motor driven, and all road wheels 330 remain in contact with the ground, all of the drive motors 320 may be inductive. Similarly, where a subset of the road wheels 330 remain in contact with the ground (e.g., where one or more wheels are stowed into the chassis 200), just those drive motors 320 in contact with the ground while towed may be inductive (with motors for stowed wheels being inductive or permanent magnet). It is understood that any conventional electronic disengagement of the drive motor(s) 320 may be employed.

For reference, conventional electric vehicles (EVs) use permanent magnet motors, which are more efficient than induction motors for high-efficiency applications such as driving electric vehicles. Here, however, even when shut off, they produce power when spun like a generator, and this power is difficult to handle if towed for long trips (and in almost all cases damages the power electronics), therefore significant barriers exist to towing conventional electric vehicles (EVs) in this way, but rather may require some sort of trailer to tow the entire vehicle. For example, if the EV was FWD then a front wheel trailer would be required to keep front wheels from touching the ground, and if the EV is AWD then a full trailer would be required to keep all 4 wheels from touching the ground during towing. However, being a multi-use vehicle, it may be highly desirable to tow the amphibious vehicle 100 on long trips. As such, these embodiments may advantageously reduce the complexity of towing. Which may be particularly beneficial for an amphibian.

According to one alternate embodiment, the drive motor 320 may include at least one hydraulic motor likewise configured to drive one or more of the road wheels 330, and the energy supply 310 may include a hydraulic pump (including conventional hydraulic components and accessories) powered by the engine 312 and configured to energize the hydraulic motor. Beneficially, in this way, the traction drive 300 may use the hydraulic motors for a distributed propulsion system (including its water drive).

As above, the chassis 200 may include and the vehicle user interface 220, which is understood to generally support or otherwise include standard car/truck driver features and controls. It is further understood, that this includes a means for road steering 230 (see FIG. 22A). The means for road steering 230 may include any conventional steering mechanism that modifies the direction of at least on road wheel 330 and is operable by the driver (e.g., via steering wheel). For example, means for road steering 230 may include traditional automobile steering system (e.g., 2-wheel rack and pinion, all-wheel steering, steer-by-wire, or differential steering, to name a few).

According to one embodiment, the traction drive 300 may be configured for torque vectoring based steering and/or steering assistance for road/land operations, or otherwise include features associated with differential steering. In particular, at least one of the road wheels 330 may have an independently controllable drive motors 320, which as a result of driver input, commands different calculated torque to produce the desired steering effect. For example, according to one embodiment, an individual electric motor may be coupled to each of the road wheels 330 and independently controlled to provide torque vectoring of the road wheels 330. Further, this may provide a much reduced power steering demand, saving weight and cost.

For example, a (left/right) pair of the road wheels 330 (preferably forward wheels) may each have a dedicated, independently controllable electric drive motor 320, which together are configured to provide torque vectoring steering/steering assist in the road mode. To illustrate, in say a left turn, with + or − torque able to be directed at any wheel, at low speed, a vehicle control computer, upon receiving input from driver via a steering wheel, applies more (+) torque to right wheel, and less (−) torque to left wheel, thus acting as a "virtual power steering.

Advantageously, this embodiment of the road steering 230 of the chassis 200 may require a smaller, lighter, less costly electric power steering unit than otherwise. This may also reduce the size of a conventional power steering assist subsystem, reducing weight and cost improving overall range of the vehicle, which may also provide enhanced performance—particularly when hydrofoiling. Further, this torque vectoring steering may provide for sufficiently reduced steering effort in the road mode, even negating the need for a power steering assist subsystem in the first instance.

According to one preferred embodiment, the traction drive 300 may be configured for distributed electric propulsion of both the road wheels 330 and one or more components of the water drive 400. In particular, the traction drive 300 may further include a water drive interface 350 that is configured to electrically power the water drive 400. For example, the power electronics 318 may include conventional switching, conduit, and connections configured to power the one or more components of the water drive. As such, the energy supply 310 may be configured as the power supply for both road and water propulsion. Advantageously, by integrating at least portions of the road propulsion system into the water drive 400 (as abovementioned), the water drive 400 may be reduced in size, reducing weight and cost improving overall range of the vehicle, without sacrificing performance, as the water drive 400 will generally not be need on land (nor the traction drive 300 on water).

Figure 11C:
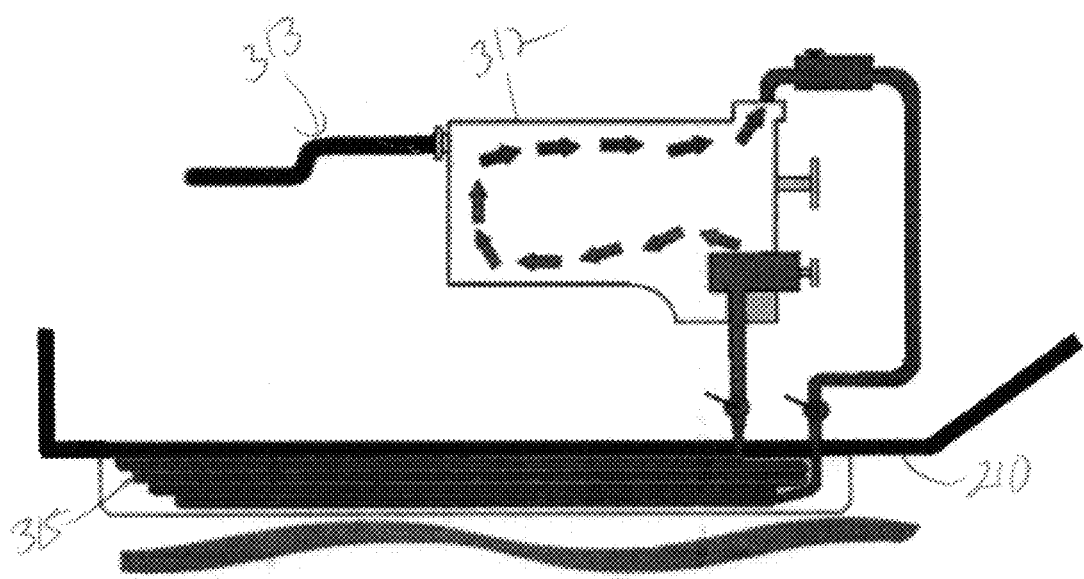
FIG. 11C is a detail view of lower hull based cooling system for the traction drive of an amphibious vehicle, according to one exemplary embodiment of the present disclosure.

FIG. 11C is a detail view of lower hull based cooling system for the traction drive of an amphibious vehicle, according to one exemplary embodiment of the present disclosure. In particular, the traction drive 300 of the amphibious vehicle 100 may include a novel cooling system for all onboard systems requiring cooling during water operations. This may be particularly useful during boating mode, as cooling airflow may be unavailable or very limited.

According to one embodiment, the energy supply 310 of the traction drive 300 may be configured to be water-cooled externally via an internal, closed loop cooling system. In particular, the engine 312 of the energy supply 310 may include a cooling system 313 including a heat exchanger 315 (such as a heat sink) built into or otherwise thermally accessible from bottom or wetted areas of the boat body 210. For example, the heat exchanger 315 may be thermally exposed to either air (vehicle in road mode) or water (vehicle in water mode) making contact with it so that the contacting media extracts the heat from the heat exchanger 315 thereby cooling the propulsion system components. As illustrated, were the engine 312 is an ICE (or an electric motor and power electronics), the heat sink of the cooling system 313 may be embedded in a sealed unit that designed to come in direct contact with water when the amphibious vehicle 100 is boating in a low speed mode. This is particularly advantageous as ram air may not be available at low or no speed during typical boating.

According to one embodiment, both the road and water propulsion systems' cooling heat exchangers 315 may be integrated into the lower hull surface spanning longitudinally from front to back with small surface ridges to enhance the heat transfer of the closed loop working fluid to the outside air or water depending on vehicle mode. This may be embodied as a keel cooler, as shown. Beneficially, when both the road and water propulsion systems are integrated together, engineering of the cooling system 313 reduces complexity, maintenance, part count, weight and cost, and increases reliability. Unlike typical marine vehicles, where water enters and exits the cooling system through the boat hull where corrosion and wear will result, this embodiment avoids potential for such wear and corrosion.

Figure 12A:
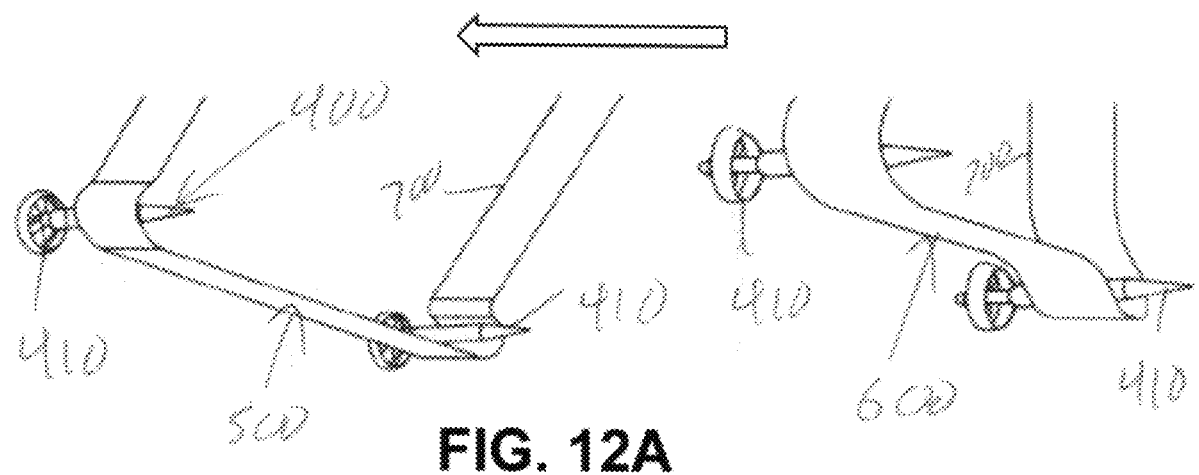
FIG. 12A is a detail view of the amphibious vehicle of FIG. 1, showing its water drive and hydrofoils and direction of forward travel.
Figure 12B:
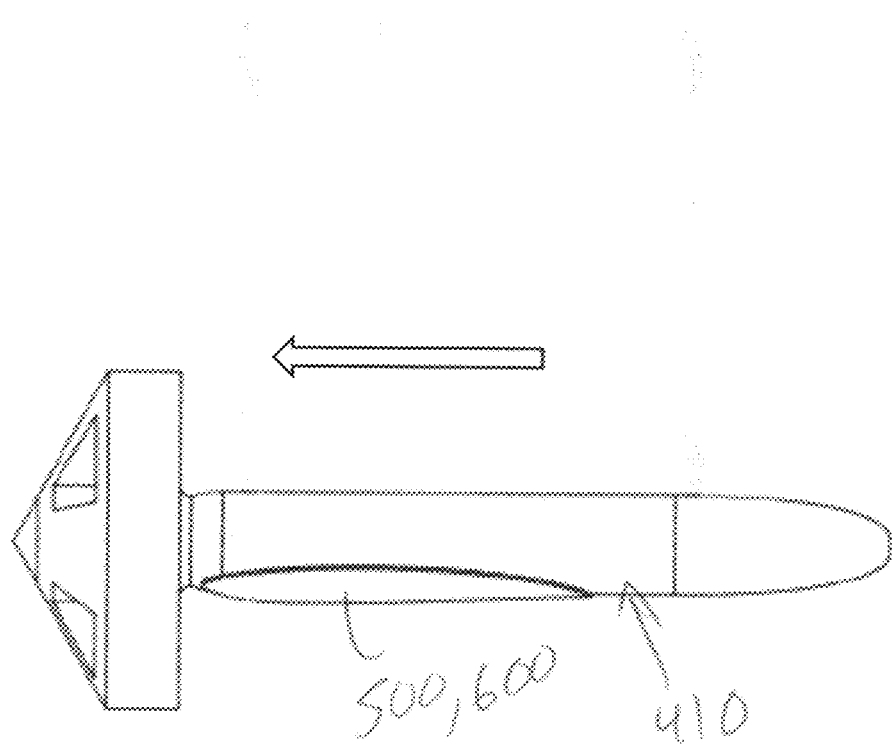
FIG. 12B is a detail view of the amphibious vehicle of FIG. 1, showing it's a thruster fixed to a hydrofoil.
Figure 13A:
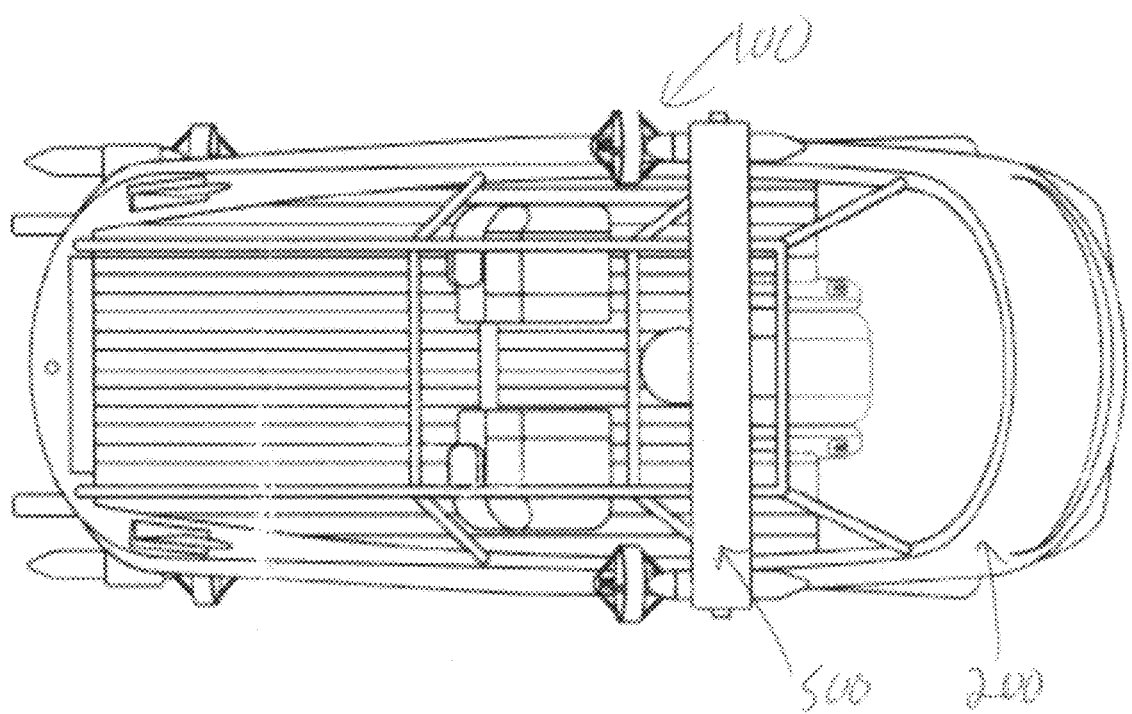
FIG. 13A is a top view of the amphibious vehicle of FIG. 1, with its hydrofoils stowed.
Figure 13B:
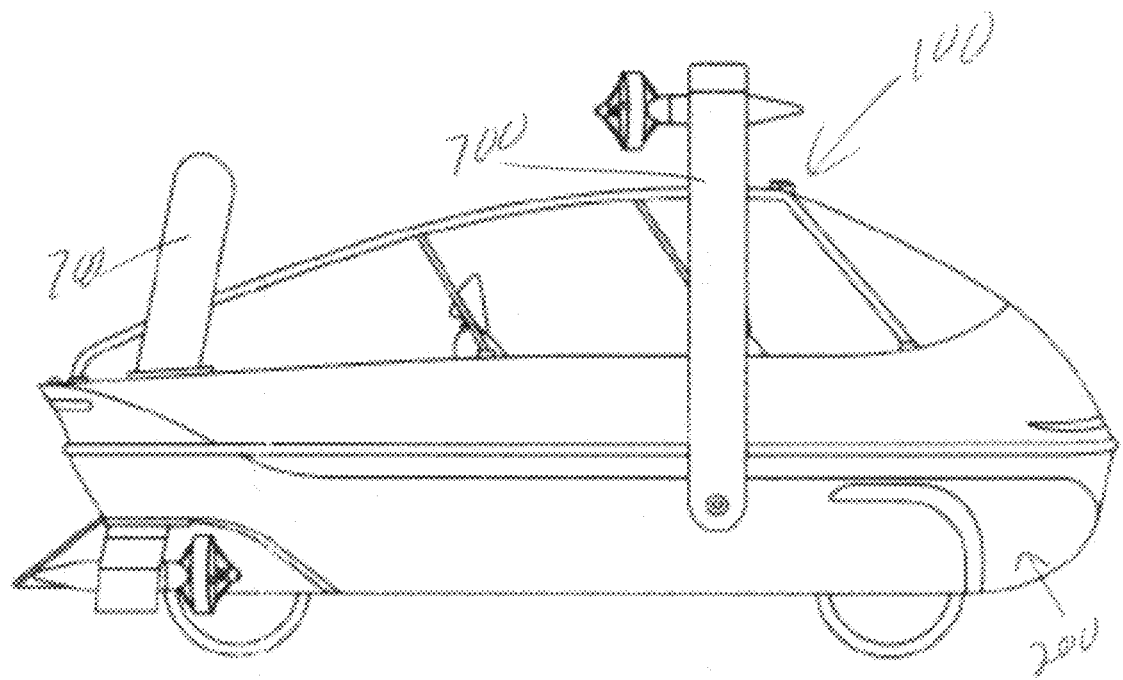
FIG. 13B is a side view of the amphibious vehicle of FIG. 1, with its hydrofoils stowed.
Figure 13C:
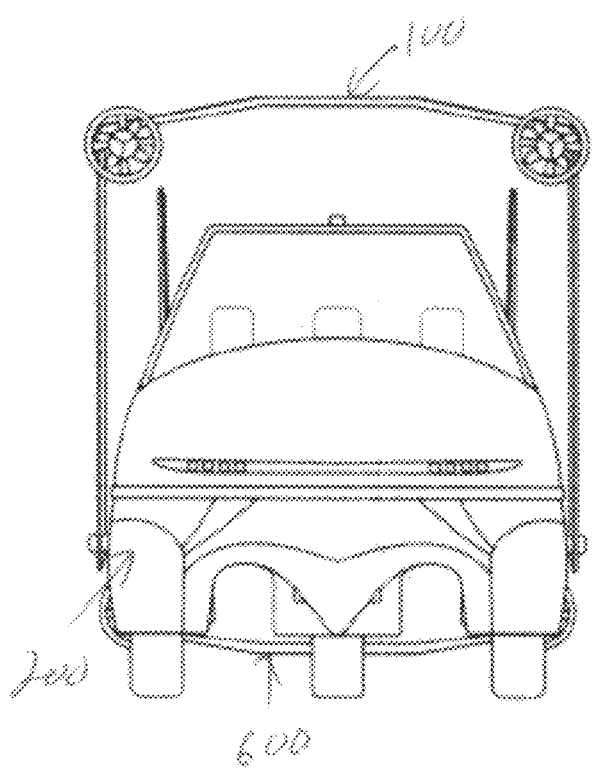
FIG. 13C is a front view of the amphibious vehicle of FIG. 1, with its hydrofoils stowed.
Figure 13D:
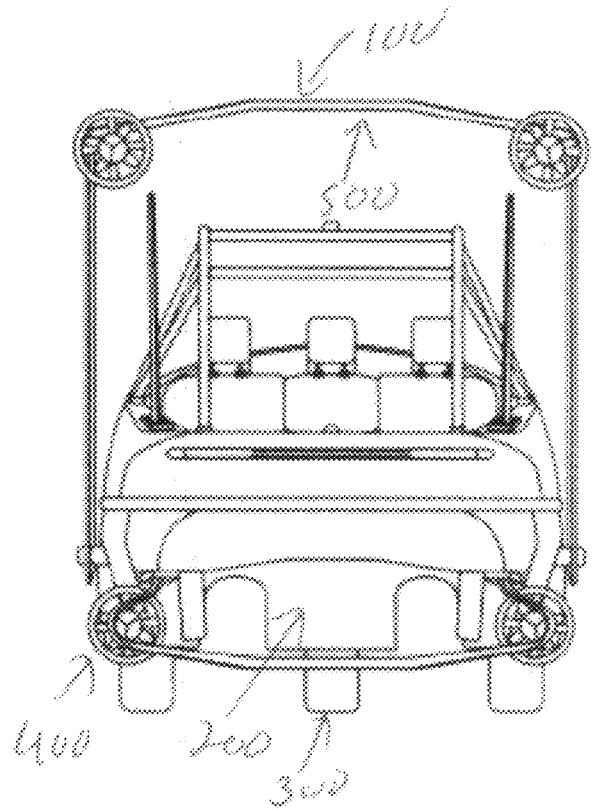
FIG. 13D is a back view of the amphibious vehicle of FIG. 1, with its hydrofoils stowed.
Figure 13E:
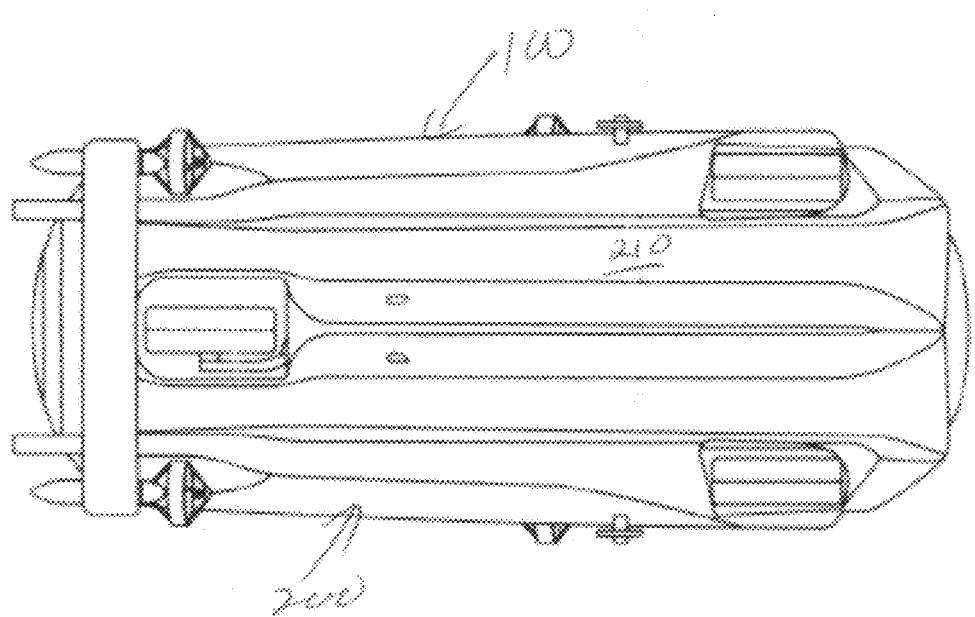
FIG. 13E is a bottom view of the amphibious vehicle of FIG. 1, with its hydrofoils stowed.

FIG. 12A is a detail view of the amphibious vehicle of FIG. 1, showing its water drive (thrusters) and hydrofoils. FIG. 12B is a detail view of the amphibious vehicle of FIG. 1, showing an electric thruster fixed to a hydrofoil with the water flow directed over the foil to improve lift to drag ratio allowing vehicle to lift out of the water at lower speed reducing drag and increasing water range of vehicle. As above, the amphibious vehicle 100 may include the water drive 400, the forward lifting hydrofoil 500, the aft lifting hydrofoil 600, and the plurality of hydrofoil struts 700 affixed to the chassis 200. Also as above, preferably, the water drive 400 will be energized by the energy supply 310 of the traction drive 300. In particular, the water drive 400 may include at least one propeller or thruster that is powered or otherwise driven by the energy supply 310. Alternately, embodiments of the water drive 400 may independently include similar or analogous elements as the traction drive, for example an energy supply that produces and/or stores its own power.

According to one embodiment, the water drive 400 may include a plurality of electric water thrusters 410 affixed to the chassis 200. (directly and/or indirectly) and electrically coupled to the energy supply 310 (e.g., electric energy storage 316) via a water drive interface 350 (e.g., connecting to the power electronics 318). Preferably, each electric thruster 410 will integrate an electric motor into a streamlined thruster body. Further, each electric thruster 410 may be configured to be water-cooled by ambient water.

Preferably and as illustrated, the electric water thrusters 410 may be configured as ducted propellers. In particular, the electric water thrusters 410 may be designed for extremely low drag using ducts having an airfoil cross section of the duct to reduce drag and improve efficiency. For example, the electric water thrusters 410 may incorporate elements of or otherwise a variation of the Kort nozzle system. The duct surrounding the propeller in the electric water thrusters improve thrust and lower drag, and the innovation improves these characteristics even further by their optimally thin profiles using the latest composite materials.

According to one embodiment, one or more of the plurality of electric water thrusters 410 of the water drive 400 may be mounted to the forward lifting hydrofoil 500 and/or the aft lifting hydrofoil 600, with portions of the electrical couple to the energy supply 310 generally routed inside of the forward lifting hydrofoil 500, the aft lifting hydrofoil 600, and/or the plurality of hydrofoil struts 700. Preferably, the water drive 400 will include at least two electric water thrusters 410 mounted to the forward lifting hydrofoil 500, and at least two electric water thrusters 410 mounted to the aft lifting hydrofoil 600. In particular, and as shown, an electric thruster 410 may be fixed proximate opposing lateral sides (i.e., left and right) of each of the forward lifting hydrofoil 500 and/or the aft lifting hydrofoil 600.

According to one embodiment, the water drive 400 may be configured for, or otherwise provide, distributed propulsion based water steering or thrust vector steering. In particular, at least two electric water thrusters 410 may be fixed to opposing lateral sides of the amphibious vehicle 100 (e.g., fixed proximate opposing lateral sides of a lifting hydrofoil). For example, instead as a result of driver input, the vehicle's computer system commands different calculated thrust to each hydrofoil mounted thruster to produce the desired steering effect.

According to one embodiment, thrust vectoring steering may be provided in both low and high speed water mode where a traditional rudder is not used for steering in water. For example, and as illustrated in FIGS. 2 and 3, the at least two electric water thrusters 410 may be fixed to opposing lateral sides of the amphibious vehicle 100 such that they remain below the waterline of the chassis 200 regardless of whether the foils are deployed or not (contrast with FIG. 18B). Beneficially, this vector steering may negate the need for a rudder. Further, by eliminating the rudder in water mode reduces drag and eliminates another subsystem reducing weight cost and maintenance improving overall reliability of the vehicle.

According to one embodiment, thrust vectoring steering may be provided where the electric water thrusters 410 are positioned a distance (i.e., radially away) from the center of mass of the amphibious vehicle 100. In particular, the electric water thrusters 410 may be independently controllable and evenly positioned to the left and right side of the centerline of the vehicle. Further, at least four of the electric water thrusters 410 may be distributed so that one of each is near each of the four corners of the vehicle (i.e., forward, aft, left, and right). In this way, the amphibious vehicle 100 may be able to make sharper turns in water, again without use of a rudder (saving weight, cost and drag improving overall water efficiency).

To illustrate, if a left turn (based on driver steering input) is required to depart from a current straight path, the control system commands the right side thrusters to output more thrust relative to the left side ones. Similarly, if a sharper left turn is required, the right thrusters are commanded to produce an even greater thrust gradient. It is understood that the thrust gradient may be provided with any combination of thrust imbalance, including no thrust and even reverse thrust. For example, when one wants to make a sharp right turn, the right side thrusters can be commanded to go in reverse while the left side thrusters are commanded to output a higher forward thrust.

This operation is also called "fly by wire" meaning no physical cables or connections exist between the user interface (e.g., steering wheel or joystick) and the mechanisms that make the vehicle steer, and is acting as a "virtual rudder". Notwithstanding, and beneficially, the amphibious vehicle 100 may still make turns in low-speed mode (i.e., not "flying" on its foils), with the vehicle sitting in the water, merely by commanding the opposite side thrusters to go into reverse, which is not possible with an actual rudder.

Addressing the marine side of vehicle efficiency, this disclosure novelly combines hydrofoils to amphibian vehicles. Further, a unique type of submerged hydrofoils are employed to reduce drag dramatically by raising the vehicle out of the water so only the foils and their connecting struts incur drag from the water. For example, hydrofoils employed on surfboards, racing sailboats, and military quick attack ships, here, the hydrofoils are stowable so as to provide for road driving.

FIGS. 13A-13E and 14A-14E are various views of the amphibious vehicle of FIG. 1, with its hydrofoils stowed and deployed, respectively, according to one exemplary embodiment. Similarly, FIGS. 15A-15D are various views of the amphibious vehicle of FIG. 5, with its hydrofoils stowed and deployed, according to exemplary embodiments of the disclosure.

As above, the amphibious vehicle 100 may include the forward lifting hydrofoil 500, the aft lifting hydrofoil 600, and the plurality of hydrofoil struts 700, which together are configured to lift and support the hull or boat body 210 of the chassis 200, above the water surface, when hydrofoiling. In particular, the forward lifting hydrofoil 500 and the aft lifting hydrofoil 600 are coupled to the chassis 200 via the plurality of hydrofoil struts 700, and (when deployed) the hydrofoil struts 700 extend sufficient length between the hydrofoils and the hull to lift the hull out of the water when they are hydrofoiling. As shown, the hydrofoils may be configured to be deployed below the chassis 200 as a lifting body. Further, the forward lifting hydrofoil 500 and/or the aft lifting hydrofoil 600 may be configured to provide lift via any combination of foil design, angle-of-attack, and articulating control surfaces. For example, the hydrofoils may generally be oriented horizontally—or with a horizontal component, and configured to lift for example via foil lifting cross-section, angle-of-attack, and/or articulating control surfaces.

Figure 17:
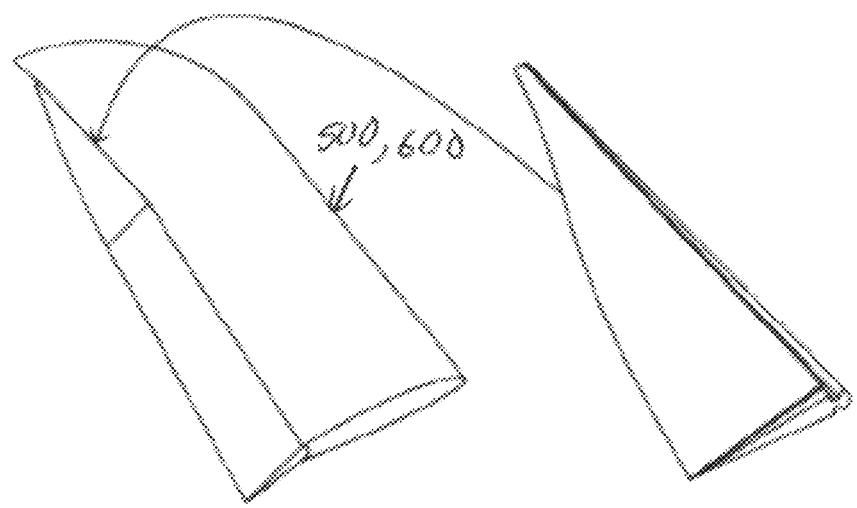
FIG. 17 is a detail view of an exemplary hydrofoil, showing its trailing edge, according to an exemplary embodiment of the present disclosure.

Further, the hydrofoils may be configured to minimize drag. In particular, any control surfaces may be substantially sealed against the rest of the foil. For example the hydrofoil trailing edge control surfaces may have sealed flexible joints with no gaps or surface irregularities allowing the actuators to deflect them as needed while maintaining the lowest drag possible. To illustrate, the hinge line where trailing edge control surface deflects may be sealed against water incursion as shown in FIG. 17. This may be accomplished by using a rubber control surface that stretches at the hinge line when the actuator forces or pushes on it. Beneficially, this reduces drag, which is the enemy of range especially when electric propulsion is used. Also reduces wear and tear and maintenance and improves reliability of the hydrofoil subsystem.

Beneficially, these foils and their connecting vertical struts may provide for a dramatic improvement in water performance. In particular, a typical planing hull of a boat may have a 4-to-1 lift-to-drag ratio, while a hydrofoil can have up to a 25-to-1 lift advantage. This means the foils lift the vehicle up and out of the water to reduce drag of the vehicle by up to 80% of when in the water. This is particularly advantageous where an electric propulsion is employed. In particular, for electric marine propulsion to provide a useful benefit to users, optimum efficiency is required to provide useful range of the vehicle in the marine mode.

Preferably, and as illustrated, each of the forward lifting hydrofoil 500 and the aft lifting hydrofoil 600 may be supported by a foil strut 700 at each lateral side. As opposed to traditional centerline hydrofoils, this may provide for additional stability and support, which may be useful in supporting the extra weight associated with a road vehicle. As above, according to one embodiment, each of the forward lifting hydrofoil 500 and the aft lifting hydrofoil 600 may have an "airfoil" like shape selected to provide lift and/or to minimize the hydrodynamic drag.

According to one embodiment, the forward lifting hydrofoil 500 and/or the aft lifting hydrofoil 600 of the amphibious vehicle 100 may be configured as "blown foils" as also in detail in FIG. 12B. In particular, the electric water thrusters 410 of the water drive 400 of may be mounted or otherwise positioned forward of the leading edge of its respective hydrofoil. For example, conventional watercraft typically rely on their propulsion source for forward propulsion and nose-up lift, and thus position the propeller or thrust output in back, or aft of its mount. Here however, the electric water thrusters 410 of the water drive 400 may be configured to provide enhanced hydrofoil lift, even at low vehicle speeds. In particular, while propellers on prior art hydrofoils are mounted in back of or pointed to the back/aft of their foils, the present disclosure instead mounts or otherwise positions the propeller/thrust source in front, blowing over the foils. Advantageously, the present disclosure's hydrofoils are configured as "short takeoff enhanced hydrofoils" for STOL (short takeoff and landing). This may be particularly useful with planning hulls as drag is rapidly reduced. In contrast, a flat bottom surfboard may instead benefit from greater initial stability and less lift at low speed.

It is understood, configuring the forward lifting hydrofoil 500 and/or the aft lifting hydrofoil 600 as "blown foils" is disclosed broadly. For example, as shown, all four electric water thrusters 410 may be mounted forward of the respective leading edges. In other embodiments, any number of thrusters that geometrically and performance-wise fit the specific hydrofoil geometry may be used (see e.g., FIGS. 16A-16C). In both cases, the electric water thrusters 410 are in front of their respective foil, providing increased lift to drag ratio (L/D), so the chassis 200 of the amphibious vehicle 100 can lift out of water, reducing drag up to 80%, at a lower vehicle water speed. Electric propulsion has recently allowed this concept to be applied to watercraft.

According to one embodiment, the electric water thrusters 410 may be positioned relative to the foils for maximum hydrostatic lift. In particular, the electric water thrusters 410 may be arranged to maximize fluid velocity flowing over the hydrofoil. For example, the electric water thrusters 410 may be integrated into or otherwise proximate the leading edge of the foil (see e.g., FIG. 12A). Alternatively, a subset of the thrusters may be electric water thrusters 410 configured as leading edge blowers, leaving a subset of the electric water thrusters 410 in the traditional "push" orientation (as opposed to "pull"). Use of "blown hydrofoils" as disclosed may increase the foils lift to drag (L/D) dramatically, which may provide for the lowest possible speed to lift the vehicle out of water, dramatically reducing drag up to 80%. This feature alone may beneficially, increase range, and may be especially critical for an electrical powertrain.

Figure 16A:
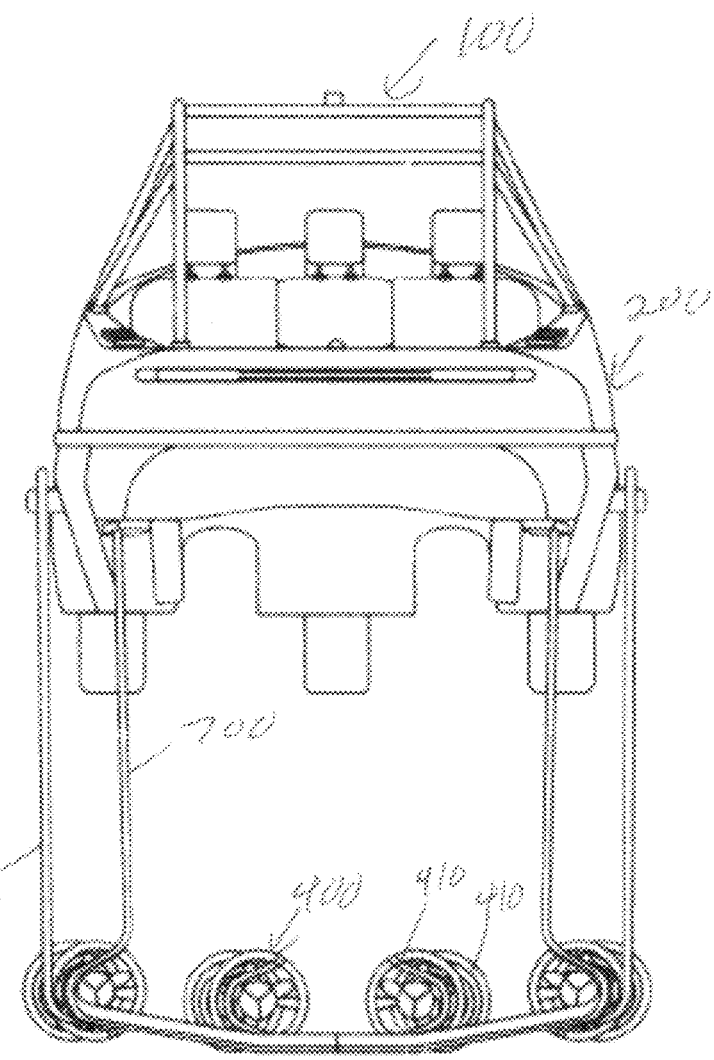
FIG. 16A is a back view of an amphibious vehicle, with its hydrofoils deployed and showing an alternate thruster configuration, according to another exemplary embodiment of the present disclosure.
Figure 16B:
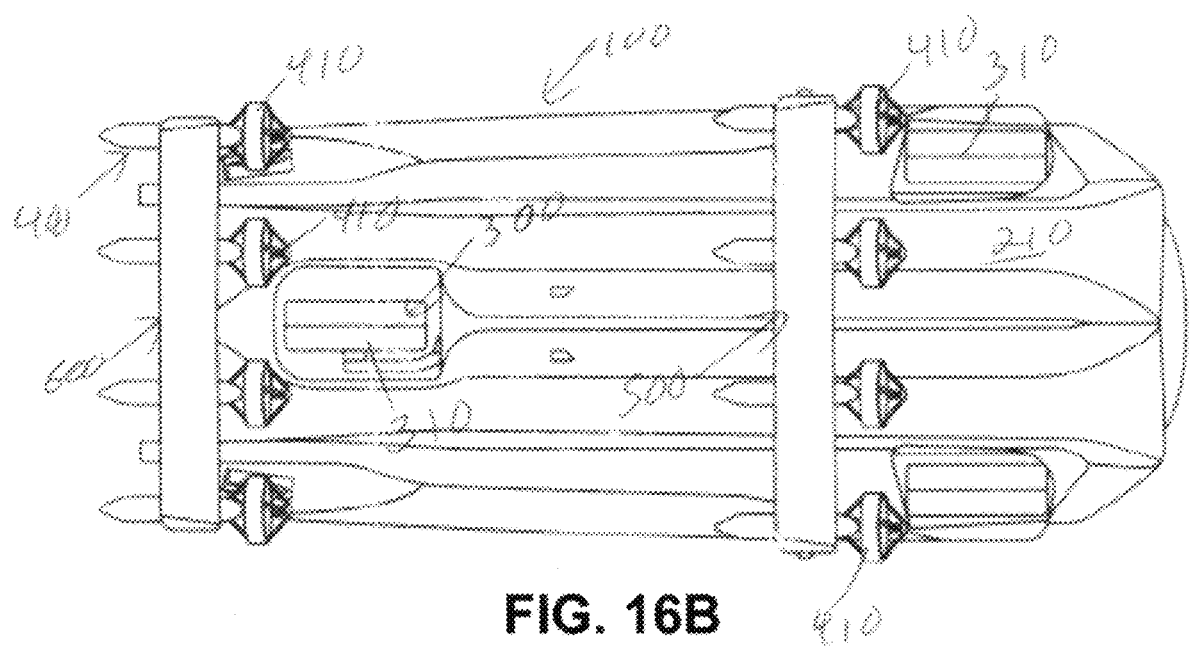
FIG. 16B is a bottom view of the amphibious vehicle of FIG. 16A with its hydrofoils deployed.
Figure 16C:
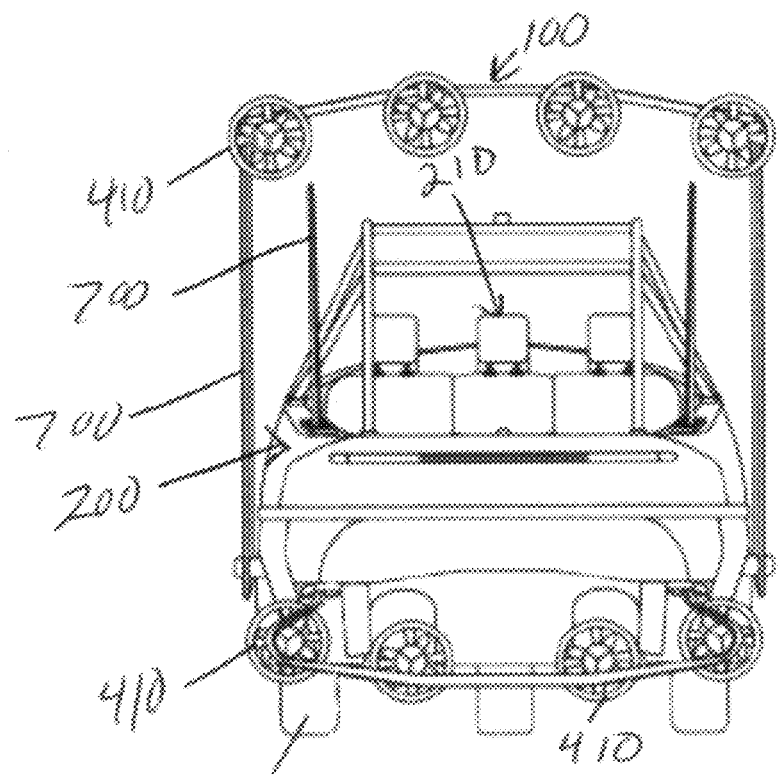
FIG. 16C is a back view of the amphibious vehicle of FIG. 16A with its hydrofoils stowed.

FIG. 16A is a back view of an amphibious vehicle, with its hydrofoils deployed and showing an alternate thruster configuration, according to another exemplary embodiment of the present disclosure. FIG. 16B is a bottom view of the amphibious vehicle of FIG. 16A with its hydrofoils deployed. FIG. 16C is a back view of the amphibious vehicle of FIG. 16A with its hydrofoils stowed. As shown, according to one embodiment, each hydrofoil may include at four (or more) electric water thrusters 410. In addition to providing for improved general performance (e.g., higher max water speed, quicker take off/foiling, sharper turning, etc.), the additional thrusters 410 may provide for improved safety via redundant systems. Further, the inner electric water thrusters may be configured to operate in unison (e.g., purely as drivers), whereas the outer thrusters may also be configured to the thrust vector steering as described above.

Also as described above, the electric water thrusters 410 may be configured for enhanced hydrofoil operation. In particular, distributing multiple thrusters in front of the submerged foil may increase its lift to drag ratio. This then may allow the foil(s) to lift the vehicle out of the water at a lower speed, resulting in dramatically reducing drag sooner. As shown here, the four electric water thrusters 410 may be distributed across the entire leading edge of the forward lifting hydrofoil 500 and the aft lifting hydrofoil 600, maximizing lift and ultimately increasing range of the amphibious vehicle 100, even more than the state-of-the-art electric hydrofoil boats of today. For example, results from inventor's Computational Fluid Dynamics showed that increasing the number of thrusters on each hydrofoil from 2 to 4 reduced the speed the vehicle would lift out of the water by ~3 mph. It is understood that a variety of thruster numbers are contemplated, including different numbers, sizes, and/or orientations ("push"/"pull").

As above, the forward lifting hydrofoil 500 and the aft lifting hydrofoil 600 are coupled to the chassis 200 via the plurality of hydrofoil struts 700, and (when deployed) the hydrofoil struts 700 extend sufficient length between the hydrofoils and the hull to lift the hull out of the water when they are hydrofoiling. In particular, the hydrofoil struts 700 may be of a length that, in addition to being completely below the chassis, exceeds an effective or operational vertical travel range of the hydrofoils 500, 600 when in operation (e.g., 1 meter below the road wheels 330 or lowest point of the chassis 200. As such, embodiments may include road wheels 330 that are stowed within the chassis 200 during water operations and/or remaining free/fixed or otherwise deployed during water operations.

According to one embodiment, the hydrofoil struts 700 may be configured to allow the power cables for the thrusters to be managed without fatigue or wear. Further, as with the hydrofoils, hydrofoil struts 700 may also be of a streamlined shape to reduce drag. For example, the hydrofoil struts 700 may include one or more cavities configured to route electrical power and control lines from the chassis 200 to the electric water thrusters 410 and/or any control surfaces. Alternately or additionally, the electrical power and control lines externally, but in a streamlined manner. Further, the electrical power and control lines may be fixed to the hydrofoil struts 700 such that a water tight seal is maintained during hydrofoil retraction and extension associated with their stowage and deployment. As discussed below, the unique retraction mechanism may resolve problems encountered in shallow water or when transporting on a trailer or especially for the storage in the garage of a large yacht respecting security and regulatory constraints.

As above, the amphibious vehicle 100 may transition between a "deployed state" and a "stowed state", where at least one of the forward lifting hydrofoil 500 and the aft lifting hydrofoil 600 is lowered or raised. As shown in FIGS. 1-7, the hydrofoils may be individually deployed or stowed, as desired. In particular, the hydrofoils may be translated and/or rotated between states.

For example, and as illustrated, the amphibious vehicle 100 may be arranged such that the forward lifting hydrofoil 500 rotates between states via its respective the hydrofoil struts 700 pivoting the forward lifting hydrofoil 500 around the front of the vehicle. Alternately, in an aft arrangement, the aft lifting hydrofoil 600 may be rotated about the back of the vehicle. It is understood that one or more of the hydrofoils may be arranged this way.

Also, for example, and as illustrated, the amphibious vehicle 100 may be arranged such that the aft lifting hydrofoil 600 linearly translates between states via its respective the hydrofoil struts 700, raising and lowering the aft lifting hydrofoil 600 from a first "stowed" position proximate and/or internal to the chassis 200 (and at least above the bottom of the road wheels 330), to a second "deployed" position distal from the chassis 200 (and at least below the bottom of the road wheels 330). Further, and as illustrated, the hydrofoil struts 700 may translate linearly at an angle, or alternately in a vertical direction, or along a curve. Alternately, in a forward arrangement, the forward hydrofoil may be translated vertically. Also, and as illustrated, the hydrofoil struts 700 may translate through portions of the chassis 200 (and alternately, outside of the chassis 200). It is understood that one or more of the hydrofoils may be arranged this way.

In both arrangements, the hydrofoil struts 700 may be rotated and/or translated manually or via active articulation. For example, in a manual arrangement, the hydrofoil struts 700 may include a lock in each state, and a user may manually reposition the hydrofoil struts 700 between their stowed and deployed states. Also for example, when arranged for active articulation, the hydrofoil struts 700 may be actuated between their stowed and deployed states mechanically, electrically, hydraulically, pneumatically, etc. via onboard and/or offboard power. Preferably, the hydrofoil struts 700 may be actuated electrically via onboard power from the energy supply 310.

Figure 18A:
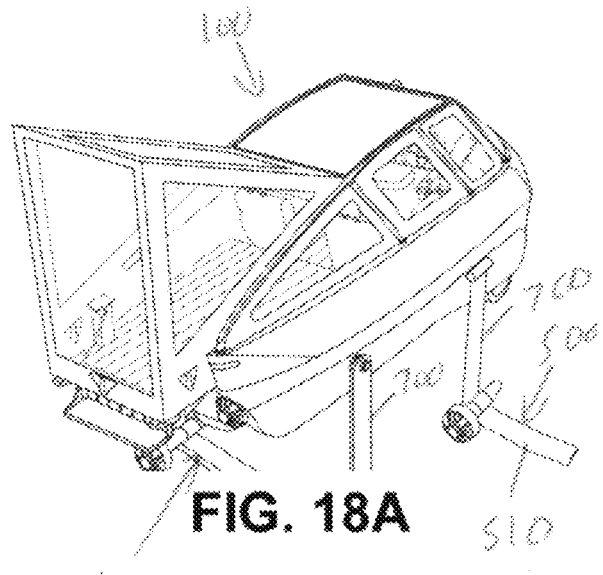
FIG. 18A is a back perspective view of an amphibious vehicle with its hydrofoils deployed, according to another exemplary embodiment of the present disclosure.
Figure 18B:
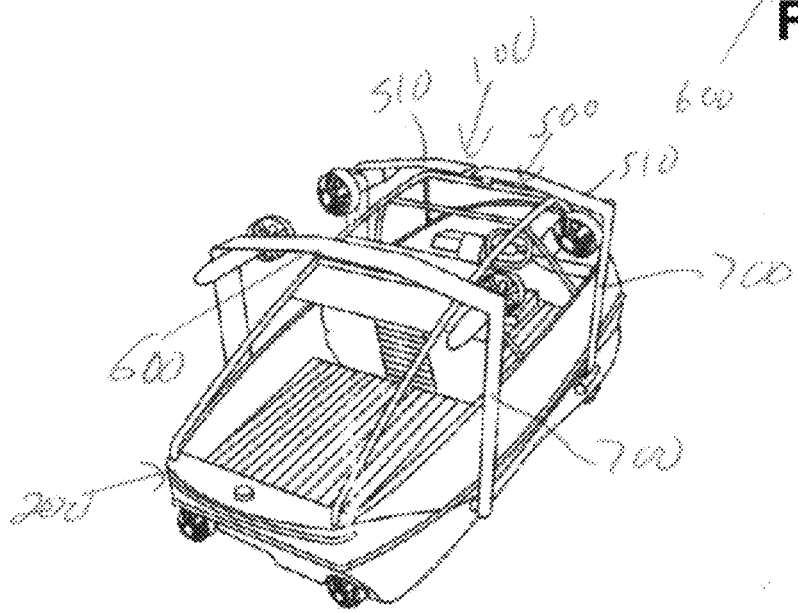
FIG. 18B is a back perspective view of the amphibious vehicle of FIG. 18A with its hydrofoils stowed.
Figure 18C:
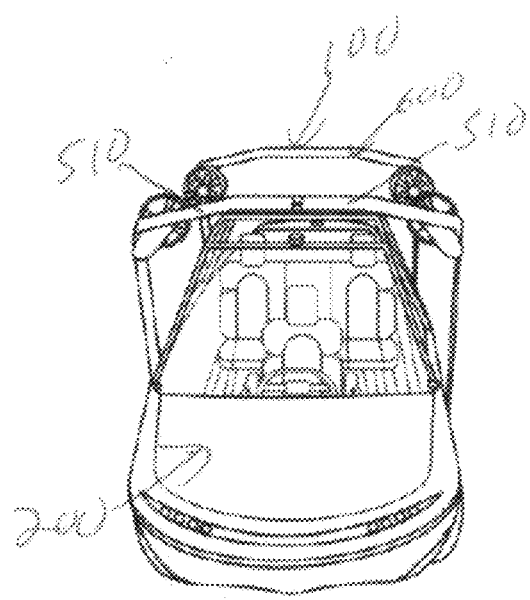
FIG. 18C is a front perspective view of the amphibious vehicle of FIG. 18A with its hydrofoils stowed.
Figure 19A:
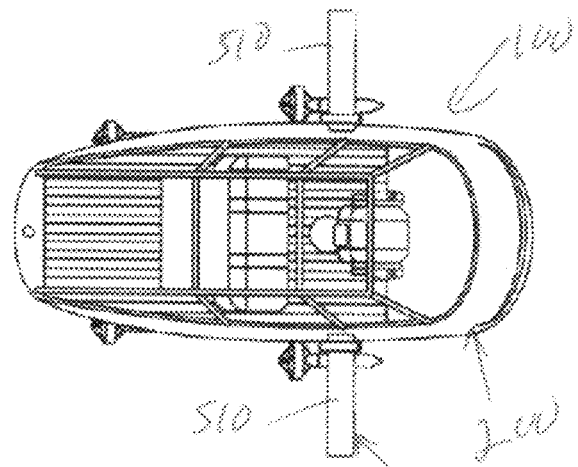
FIG. 19A is a top view of the amphibious vehicle of FIG. 18A with its hydrofoils deployed.
Figure 19B:
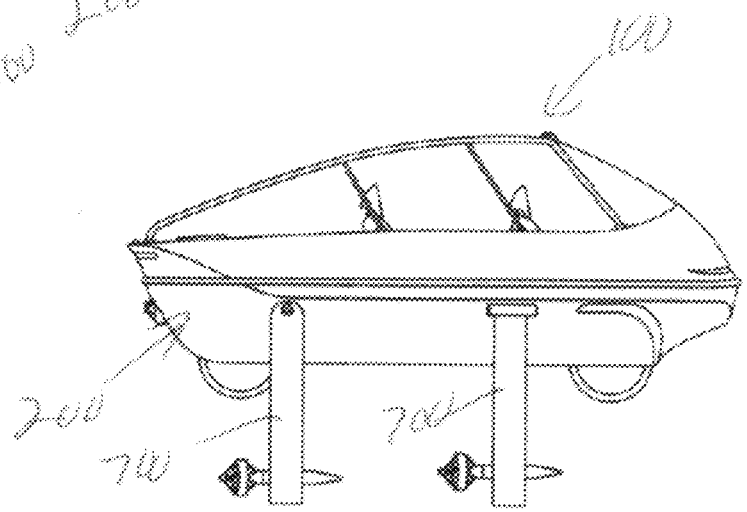
FIG. 19B is a side view of the amphibious vehicle of FIG. 18A with its hydrofoils deployed.
Figure 20A:
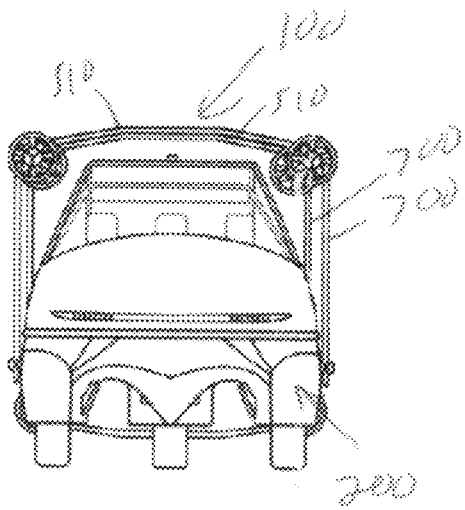
FIG. 20A is a front view of the amphibious vehicle of FIG. 18A with its hydrofoils stowed.
Figure 20B:
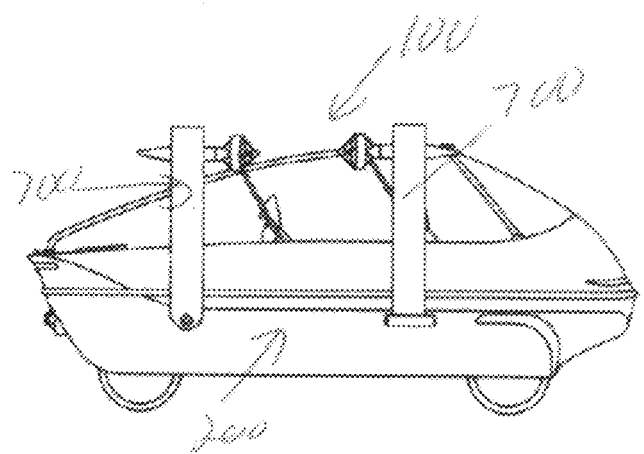
FIG. 20B is a side view of the amphibious vehicle of FIG. 18A with its hydrofoils stowed.
Figure 21A:
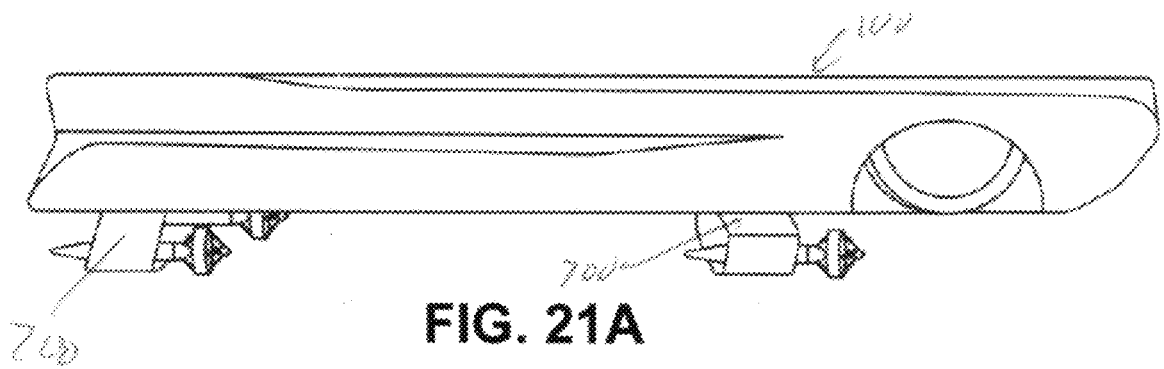
FIG. 21A is a detail view of an amphibious vehicle, showing its hydrofoils in a first position, according to an exemplary embodiment of the present disclosure.
Figure 21B:
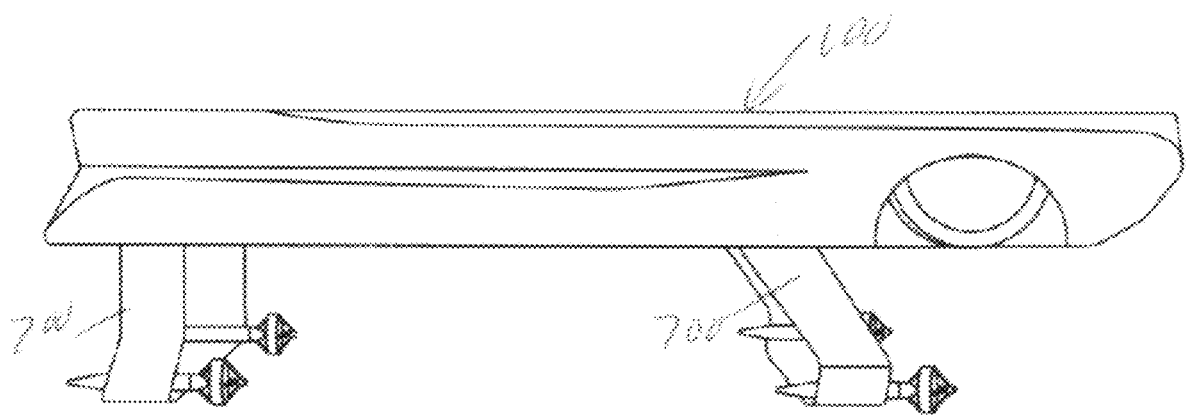
FIG. 21B is a detail view of an amphibious vehicle, showing its hydrofoils in a second position, according to an exemplary embodiment of the present disclosure.
Figure 21C:
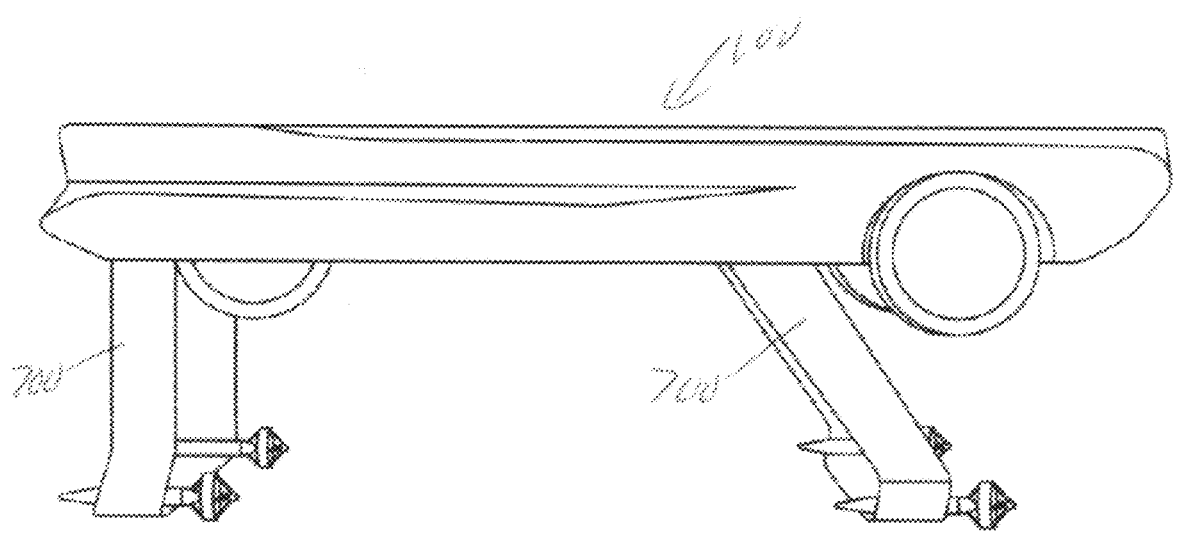
FIG. 21C is a detail view of an amphibious vehicle, showing its hydrofoils in a third position, according to an exemplary embodiment of the present disclosure.

FIG. 18A-18C are various perspective views of an amphibious vehicle with its hydrofoils deployed and stowed, according to another exemplary embodiment of the present disclosure. In addition, FIGS. 19A-20B 18A-19B are various plan views of the amphibious vehicle of FIG. 18A 11A with its hydrofoils deployed and stowed. Here, the amphibious vehicle 100 is arranged such that the aft lifting hydrofoil 600 rotates between states via its respective the hydrofoil struts 700 pivoting the aft lifting hydrofoil 600 around the back/aft of the vehicle, (analogous to the forward lifting hydrofoil 500 described above). In addition, here the forward lifting hydrofoil 500 is bifurcated, with each half rotating about the sides of the chassis 200.

With regard to this embodiment of the forward lifting hydrofoil 500, the amphibious vehicle 100 may be arranged with the forward lifting hydrofoil 500 separated into two cantilever wings 510, each fixed to one foil strut 700 on opposing sides of the chassis 200. As above, each foil strut 700 may rotate about opposing sides of the chassis 200, with the stowed state orienting the cantilever wings 510 inwardly, proximate to each other above the chassis 200, and the deployed state orienting the cantilever wings 510 outwardly, distal from each below the chassis 200. Preferably, in both states, the hydrofoil struts 700 may be vertically oriented, however, angled orientations are contemplated. Also, as above, the hydrofoil struts 700 may be manually or actively articulated between states. Preferably, the hydrofoil struts 700 may be actuated electrically via onboard power from the energy supply 310 (FIG. 11B). Also as above, the features, sizing, and articulation means of the hydrofoil struts 700 may be as disclosed herein, or combined as desired.

Figure 22A:
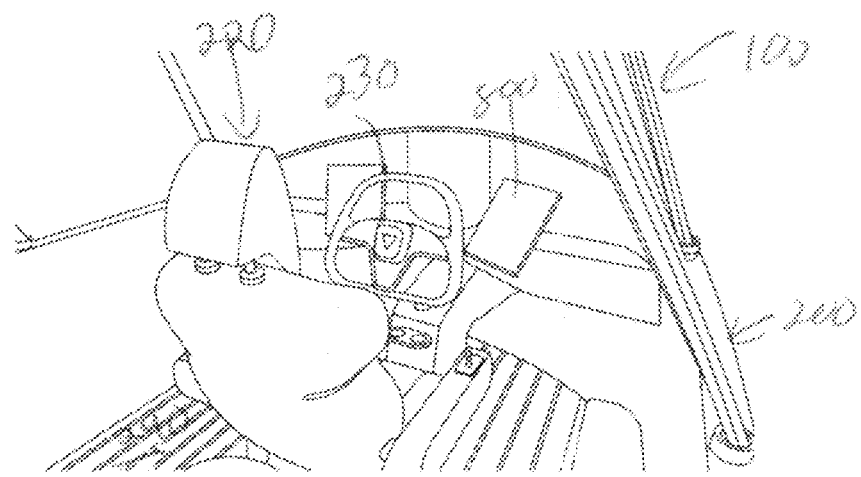
FIG. 22A is a detail view of an amphibious vehicle, showing its user interface, according to an exemplary embodiment of the present disclosure.
Figure 22B:
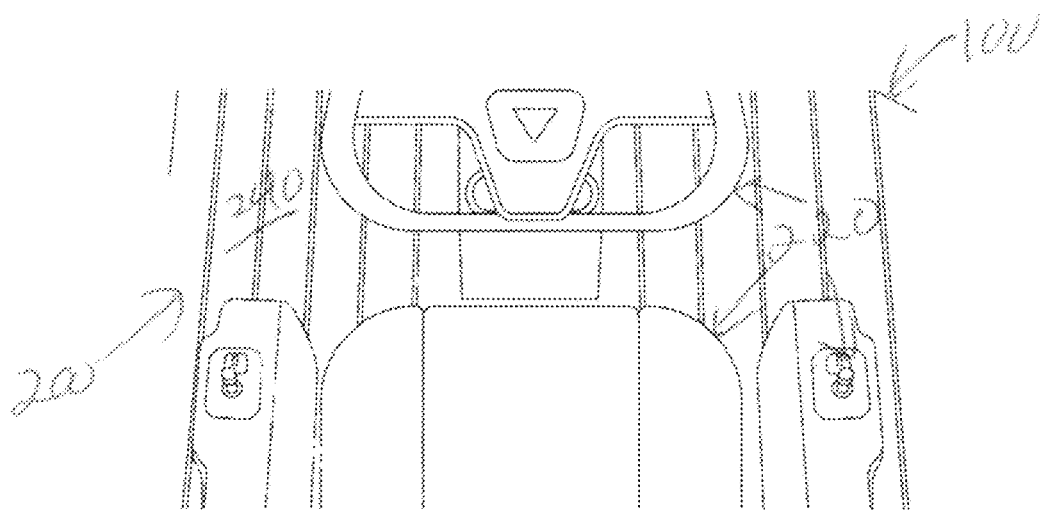
FIG. 22B is a detail view of the amphibious vehicle of FIG. 22A, showing its user interface.
Figure 22C:
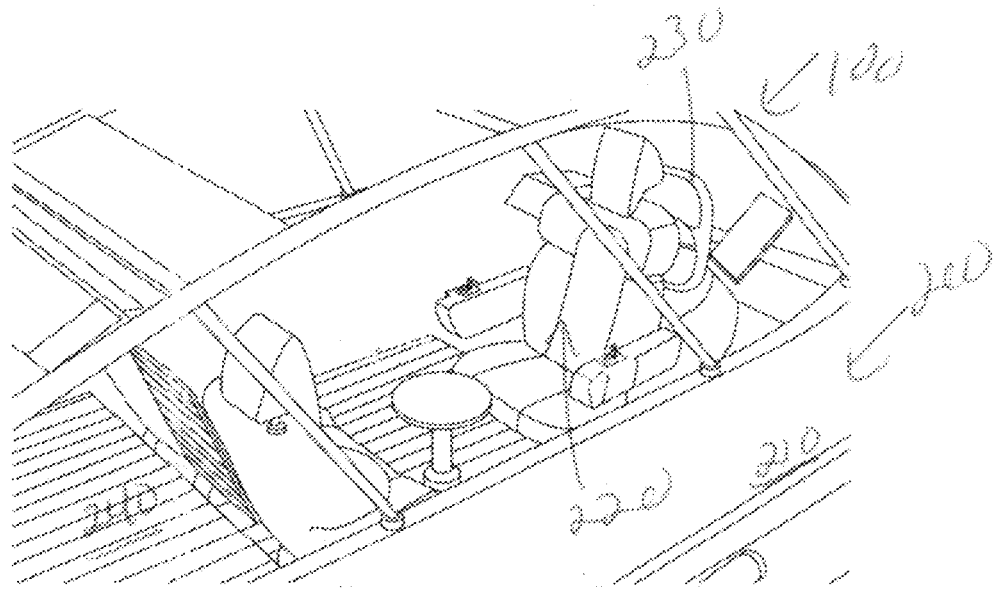
FIG. 22C is a detail view of the amphibious vehicle of FIG. 22A, showing its user interface.

FIG. 22A-22C are detail views of an amphibious vehicle, showing its user interface, according to an exemplary embodiment of the present disclosure. As above, the amphibious vehicle 100 may include the chassis 200, which may include the boat body 210 and means for road steering 230, and is configured as the base structure to which various elements are physically coupled. In addition, the chassis 200 may include a user interface 220 or cockpit. Further, the chassis 200 may include a modular deck 240. According to one embodiment, the cockpit may be integrated with the deck 240.

The user interface 220 may generally include any and all conventional vehicle controls for both an automobile and a watercraft. In addition, the user interface 220 may include a designated driver/pilot seat proximate the controls. For example, the user interface 220 may include a driver's seat located in a forward portion of the amphibious vehicle 100, having propulsion, navigation, and other operation controls at hand.

According to one embodiment, one or more controls may be combined in the user interface 220. In particular, the user interface 220 may include a single control for both land steering and water steering, where user inputs are interpreted and applied as appropriate for the drive mode selected. For example, on land, a steering control may be configured to turn the steering road wheels and/or vary their relative torque, and on water, to turn a control surface and/or vary the relative thrust of one or more thrusters. Preferably, the user interface 220 may include an operation mode selector, for example, separating water and land operation paradigms.

Preferably, the user interface 220 may include one or more user controls resembling automobile controls. In particular, the user interface 220 may include a steering wheel resembling an automobile steering wheel. Similarly, the user interface 220 may include an accelerator and brake resembling an automobile gas pedal and brake. Alternately, the user interface 220 may include an automotive type steering wheel for steering on both land and water, but separate control for acceleration and braking (e.g., pedals and throttles).

According to one embodiment, one or more of the controls may be electronic or "fly-by-wire" controllers (e.g., joystick, mode selector, steering wheel controller, etc.). Further, one or more of the controls may be computer controlled or computer assisted. In particular, upon receiving input from the user driver via electronic controller, a vehicle controller 800 may actuate the desired system, incorporating any available sensor/feedback data and making any appropriate adjustments and/or limitations.

Further, one or more commands may be automated by the vehicle controller 800. In particular, a digital flight control system derived from modern day drone technology may be employed to not only provide all marine "fly by wire" control functions but also to control and/or assist road propulsion functions. Where regulations require mechanical connection of the driver steering wheel to the steering wheels, the steering may still be monitored and supported by a digital torque vectoring system within the vehicle controller 800.

According to one Further, the vehicle controller 800 may also handle all transitions from/to a low speed mode (boating) to a high speed or "flying" mode (hydrofoiling), maintain flight height over water surface, pitch, and roll and landing from the "flight mode". Here, low-speed water travel or "boating" means the amphibious vehicle 100 sits in the water like a traditional boat, and high speed water travel or hydrofoiling/flight means the amphibious vehicle 100 is lifted out of the water and only is supported by the foils. According to one embodiment, the vehicle controller 800 may generally be disengaged from automating or otherwise managing the pilot's inputs when boating in low speed mode. In contrast, transitioning to and during high speed mode, the vehicle controller 800 may monitor and automatically maintain the vehicles height above the water surface independently of user input, but rather through sensors, the attitude (roll as in banking left/right, pitch as in nose down or up) of the vehicle through a digital or solid state gyroscope, and the drivers throttle and steering to constantly supply control outputs to the foil control surfaces to maintain a desired vehicle attitude with respect to the water surface. According to one embodiment, the vehicle controller 800 may provide for a manufacturer's remote intervention via a dedicated site monitored by PC or Smartphone.

According to one embodiment, the chassis 200 may be reconfigurable based on use. In particular, one or more components or aspects of the chassis 200 may be converted between operation modes or user preferences. For example, the cockpit may be integrated with the deck 240 and accessible by more than the driver. Also for example, the driver's seat may be 360 degree rotatable and/or movable/removable. Also for example, one or more of the driver's controls may be movable and/or removable.

Figure 23A:
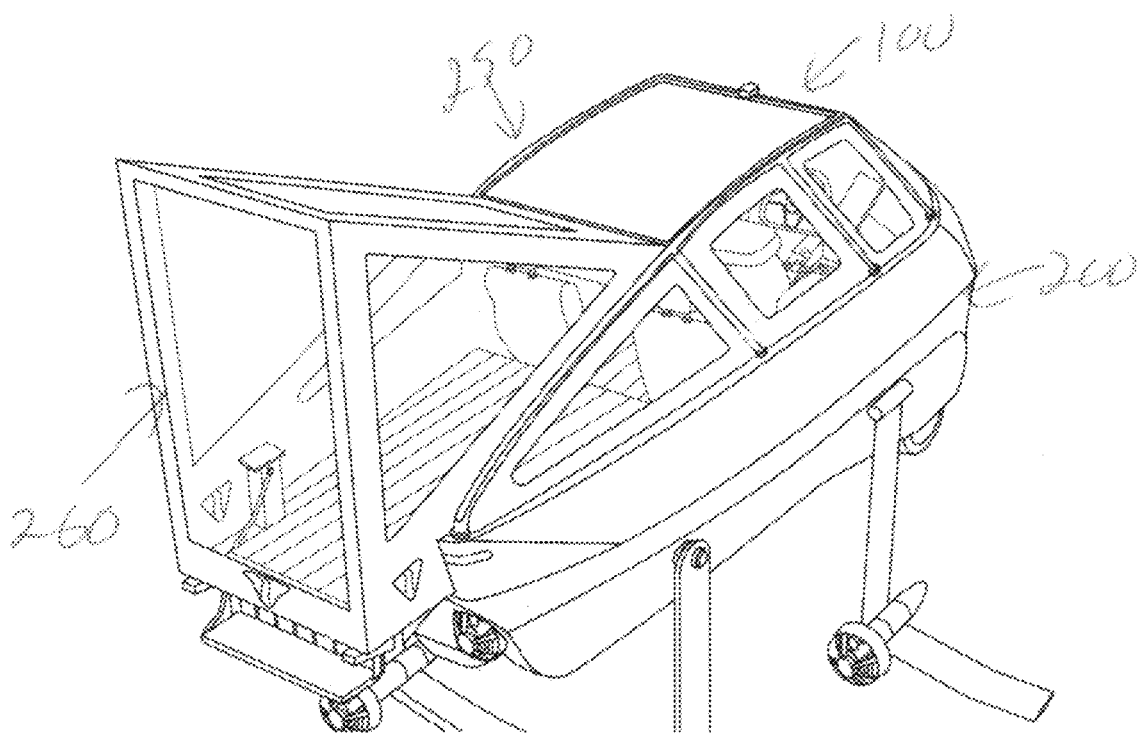
FIG. 23A is a back perspective view of an amphibious vehicle, according to another embodiment of the present disclosure.
Figure 23B:
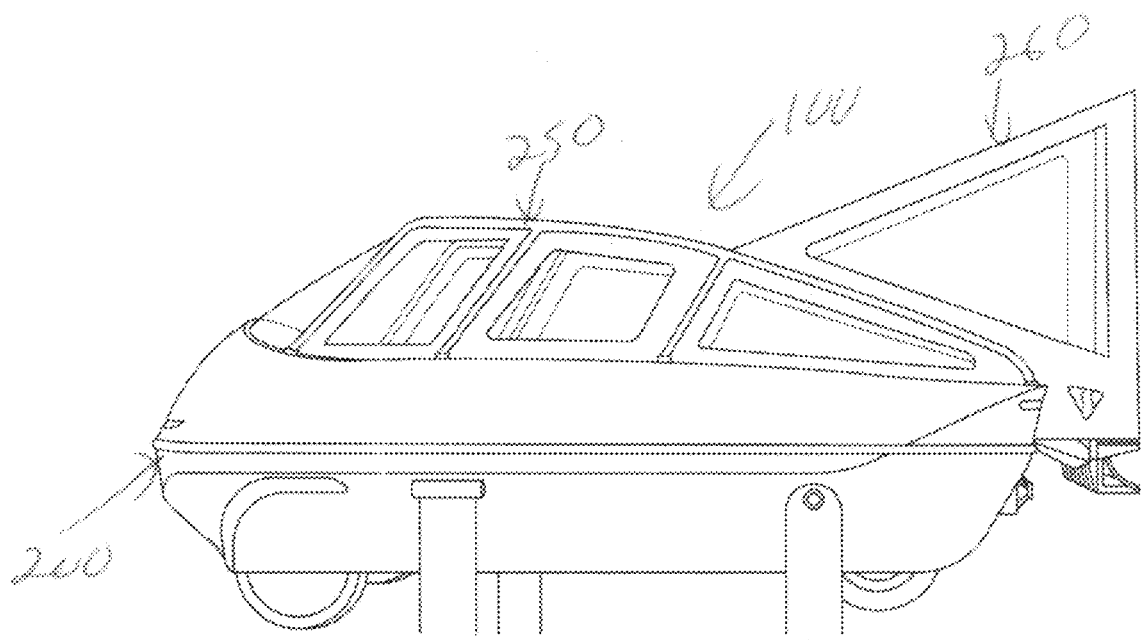
FIG. 23B is a side view of the amphibious vehicle of FIG. 23A.

Likewise, the chassis 200 may include a modular deck 240. In particular, the floor of the amphibious vehicle 100 (i.e., in the driver/passenger accessible area) may employ a modular decking and attachment system to allow multiple arrangements of accessories, seats, tables, etc. For example, rather than a fixed floor, here, the modular deck 240 may include floor tiles that can be easily released thru use of an attachment system and replaced by accessories that snap in. With the attachment system of the modular deck 240 items such as coolers, tables, chairs, fishing rod holders, porta-potty, fresh water tank, bait tank, shower module, etc. may be removably installed to the amphibious vehicle 100 on a temporary or permanent basis. Beneficially, this modularity allows user customization for different applications the customer intends for the use of the vehicle allowing one vehicle to serve many valuable purposes for the user FIG. 23A-23B are different views of an amphibious vehicle, according to another exemplary embodiment of the present disclosure. Here, the chassis 200 of the amphibious vehicle 100 includes a cabin cover 250 that is reconfigurable and an add-on accessory 260. As above the cabin cover 250 may be generally open (e.g., including roll bars or an external frame). As shown here, the cabin cover 250 may be reconfigurable to be completely closed on all sides. While the cabin cover 250 is shown as convertible, it is understood that either configuration may remain fixed (e.g., permanently open or permanently closed). Also as shown here, the add-on accessory 260 may include an enclosed expansion area configured as a pop-up tent. It is understood that the add-on accessory may include any conventional add on found in land vehicles and watercraft.

Figure 24:
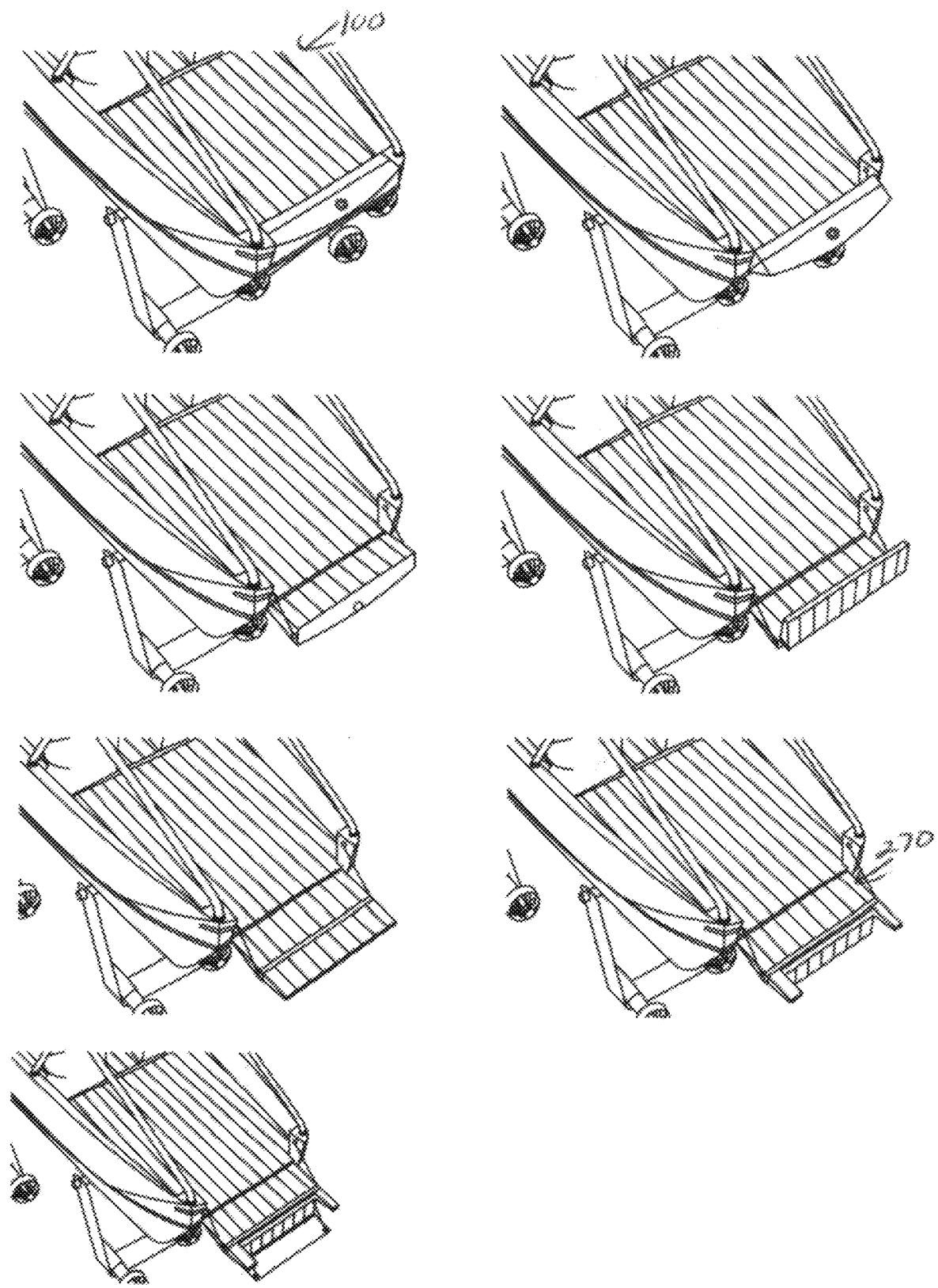
FIG. 24 is a flow diagram of an amphibious vehicle, showing a deployable swim platform according to an exemplary embodiment of the present disclosure.

FIG. 24 is a step diagram of an amphibious vehicle, showing a deployable swim platform according to an exemplary embodiment of the present disclosure. In particular, here, the chassis 200 of the amphibious vehicle 100 may further include a multifunction tailgate 270. In particular, the multifunction tailgate 270 may be reconfigurable between a stowed state and a deployed state. For example, the multifunction tailgate 270 may be deployable into a vehicle access on land—including steps, a swim platform in water, and the like. Also for example, the multifunction tailgate 270 may stow as vehicle back wall, a vehicle bumper, a desk/work station, etc. Moreover, the swim platform 270 may be electrically coupled to the energy supply 310 and configured to actively deploy and retract as a "multi-function tailgate".

Figure 25:
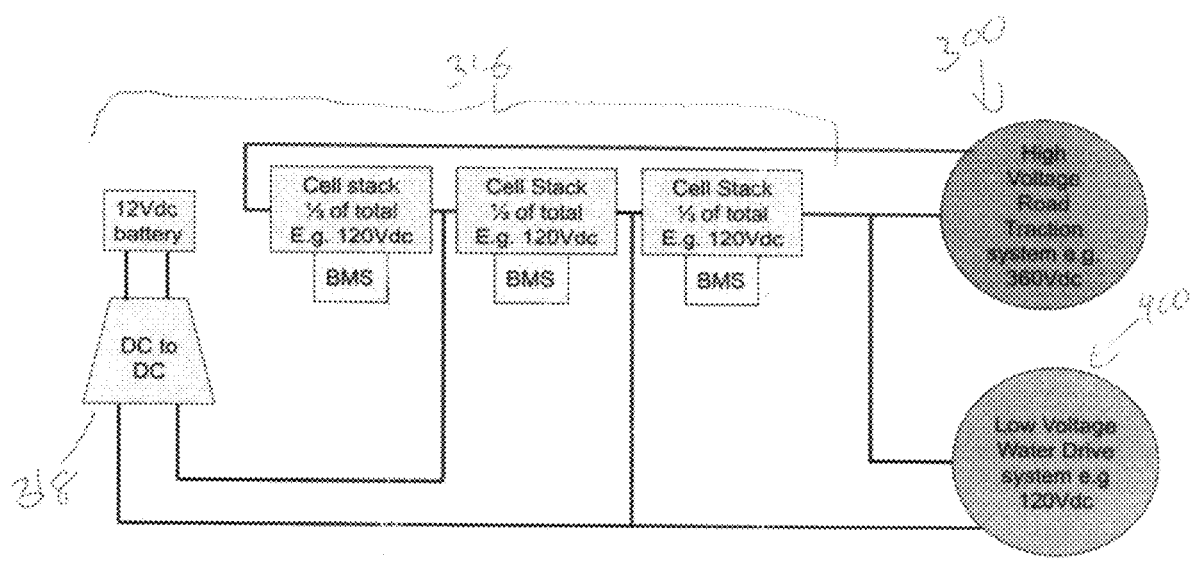
FIG. 25 is a schematic diagram showing a single battery system supporting different voltage requirements of the water drive and land traction powertrains, according to an exemplary embodiment of the present disclosure.

FIG. 25 is a schematic diagram showing a single battery system supporting different voltage requirements of the water drive and land traction powertrains, according to an exemplary embodiment of the present disclosure. Conventionally, to power two systems with characteristically distinct loads (e.g., EV traction drive and vehicle hotel loads), two completely separate battery systems would be employed or a very expensive, large and heavy DC-DC power conversion unit would be used to convert the high voltage of the traction drive to the low voltage for the low voltage system. Here however, a novel arrangement is disclosed to support the different voltage needs of a road traction system and a water drive system. In particular, each different powertrain system may be configured to draw power from a single vehicle powertrain battery system. For example, and as shown, the traction drive 300 may be configured to draw from or otherwise electrically coupled across the entire storage 316 (e.g., drawing a full 360 VDC), whereas the water drive 400 may be configured to draw from or otherwise electrically coupled across a subset of the energy storage 316 (e.g., drawing one third or 120 VDC).

According to one embodiment, the entire energy storage 316 may be configured as described above, and additionally, the vehicle's low voltage system (e.g., 12 VDC loads) may be configured to draw from or otherwise electrically coupled across another subset of the energy storage 316. For example, the water drive 400 may be configured to draw from an upper third of the energy storage 316 and the vehicle's low voltage system may be configured to draw from a lower (i.e., drawn from nodes of lower potential) subset of the energy storage 316. Also for example, and as shown, the water drive 400 may be configured to draw from the top third of the energy storage 316 and the vehicle's low voltage system may be configured to draw from a lower, adjacent third of the energy storage 316, sharing a common node.

According to one embodiment, power electronics 318 may include a DC-DC converter configured to power the low voltage (i.e., 12 VDC) system. In particular, and as described above, the vehicle's low voltage system may be configured to draw from a subset of the energy storage 316 that is lower than the subset of the water drive 400, and the DC-DC converter may include or otherwise be configured as a 12 VDC charger/maintenance subsystem configured to buck down the drawn voltage (e.g., 120 VDC) to charge a low voltage battery (e.g., 12 VDC). Beneficially, this may allow for lower cost power conversion electronics to be used.

This disclosure adds valuable functions in both modes, marine and road travel to the vehicle expanding its applications and usefulness to the vehicle user. Prior art marine vessels and amphibians do not have multi-function tailgates. Not having such features made easy access to the amphibious vehicle in both modes more difficult and prior art vehicles did not have doors, as they were only equipped with high side gunwales which the occupants needed to climb over to access the vehicle. Also, while large yachts do have "toy" garages and foldout swim platforms, they are not combined into one reconfigurable feature. Beneficially, the multifunction tailgate 270 may provide distinct and valuable functionality when the vehicle is in road travel mode and in marine mode. For example, the multifunction tailgate 270 may provide the ability to extend the rear deck area for both recreational purposes such as a swim deck and work applications such as object repair and carrying needs, and easier access to vehicle interior in both marine and road travel modes.

As disclosed herein the amphibious vehicle 100 may provide many benefits and exceptional performance in each mode, not previously available. In particular, in its water mode, it reduces friction by more than half compared to a conventional boat. Relatedly, the marine range achieved by the amphibious vehicle 100 may be at least 4 times greater than that of the best comparably sized electric boats currently on the market and is close or equal to that of ICE powered boats of the same size. To solve these problems, the amphibious vehicle 100 may preferably be embodied as a streamlined trimaran or catamaran hull based vehicle that improves the efficiency for both on land and water with introduction of distributed electric propulsion, either all battery or series hybrid, that is, occasionally supported by a highly efficiency low emissions constant RPM range extender (REX) which simply maintains the battery state of charge with no connection to either the land or water propulsion systems, as shown in FIG. 11B. On land, distributed propulsion in this disclosure offers that each wheel that touches the ground has an electric motor to drive it, giving the vehicle "AWD—all-wheel-drive".

Further, Benefits of the present disclosure may include avoiding the discomfort of slapping waves against the bottom of the vehicle hull, by flying over the waves, leaving virtually no wake (also, protecting the coastlines around the world). Further, its advanced control system, which makes a naturally unstable boat incredibly stable, may also provide for completely silent and automated control and navigation (particularly with electric motors). In addition, there may be significant savings in operation and maintenance costs. In particular, the per mile cost to operate this vehicle as a marine vehicle should be ~95% lower than comparable fuel-powered boats of the same size. Moreover, the less complex electric powertrain disclosed may provide for very low maintenance costs. Also, computerized control may provide for operation optimized, efficient piloting, and even ease of operation.

The above description of the various embodiments is provided to enable a person of ordinary skill in the art to make or use the subject matter of the disclosure. Various modifications to the embodiments will be readily apparent to those skilled in the art, and the generic principles defined herein may be applied to other variations without departing from the spirit or scope of this disclosure. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art.

The invention claimed is:

1. A personal amphibious vehicle for land and water transport, the personal amphibious vehicle comprising:
 a chassis including a lower body, an upper portion, a forward portion, an aft portion, and a vehicle user interface, the chassis configured for land travel and as a watercraft;
 a traction drive mounted to the chassis, the traction drive including at least three road wheels, the traction drive configured to propel, stop, and steer the personal amphibious vehicle on land;
 a water drive mounted to the chassis, the water drive including at least two water thrusters, the water drive configured to propel and steer the personal amphibious vehicle in water;
 a forward lifting hydrofoil configured to lift the forward portion of the chassis while hydrofoiling;
 an aft lifting hydrofoil configured to lift the aft portion of the chassis while hydrofoiling; and
 a plurality of hydrofoil struts, each mounted to the chassis and to at least one of the forward lifting hydrofoil and the aft lifting hydrofoil, the plurality of hydrofoil struts each configured to dynamically transition between a deployed state and a stowed state, said deployed state being where at least one of the forward lifting foil and the aft lifting foil is positioned in an extended position below the lower body of the chassis, and said stowed state being where the at least one of the forward lifting foil and the aft lifting foil is positioned in a retracted position above the extended position, relative to chassis; and
 wherein at least one of the water thrusters of the water drive are configured to exhaust thrust proximate a leading edge of at least one of the forward lifting foil and the aft lifting foil.

2. The personal amphibious vehicle of claim 1, further comprising a flight controller configured to modulate control surfaces of the forward lifting foil and the aft lifting foil to stabilize the chassis while hydrofoiling.

3. The personal amphibious vehicle of claim 1, wherein at least one of the plurality of hydrofoil struts is further configured to dynamically transition to an intermediate state between the deployed state and the stowed state, said intermediate state being where at least one of the forward lifting foil and the aft lifting foil is fixed between its extended position and its retracted position.

4. The personal amphibious vehicle of claim 1, wherein at least one of the plurality of hydrofoil struts is further configured to dynamically transition into and out of the chassis.

5. The personal amphibious vehicle of claim 1, wherein at least one of the forward lifting foil and the aft lifting foil is located underneath the chassis when in its extended position.

6. The personal amphibious vehicle of claim 1, wherein at least one of plurality of hydrofoil struts is configured to rotate from its stowed state, away from the chassis, to its deployed state.

7. The personal amphibious vehicle of claim 1, wherein at least one of the at least two water thrusters is configured to steer the personal amphibious vehicle while operating as the watercraft.

8. The personal amphibious vehicle of claim 1, further comprising an electrical energy storage; and
wherein the traction drive is electrically driven and is powered by the electrical energy storage.

9. The personal amphibious vehicle of claim 1, further comprising a prime mover configured to power both the traction drive and the water drive.

10. The personal amphibious vehicle of claim 9, wherein the prime mover is an internal combustion engine, the personal amphibious vehicle further comprising:
an electrical energy storage;
an air cooled cooling system configured to cool the internal combustion engine during land travel; and
a water cooled cooling system configured to cool the internal combustion engine during water travel; and
wherein the traction drive is electrically driven, and is powered by the electrical energy storage; and
wherein the water drive is electrically driven, and is powered by the electrical energy storage.

11. The personal amphibious vehicle of claim 1, wherein the traction drive is configured to dynamically transition between a watercraft state and a land travel state, said watercraft state being where at least two of the at least three road wheels are at least partially retracted into the chassis, and said land travel state being where the at least three road wheels are configured to be direct contact with a ground.

12. The personal amphibious vehicle of claim 11, wherein the traction drive is further configured to fix the at least two of the at least three road wheels into a plurality of heights from the chassis.

13. The personal amphibious vehicle of claim 1, wherein the at least two water thrusters of the water drive are independently controllable from each other and the water drive is further configured to steer the personal amphibious vehicle in water via outputting a thrust gradient between the at least two water thrusters.

14. The personal amphibious vehicle of claim 1, wherein the traction drive is further configured to steer the personal amphibious vehicle on land via varying a relative torque applied to the at least three road wheels.

15. The personal amphibious vehicle of claim 14, wherein the traction drive is further configured to brake the personal amphibious vehicle on land via application of a reverse torque to the at least three road wheels.

16. The personal amphibious vehicle of claim 15, further comprising:
a flight controller configured to modulate control surfaces of the forward lifting foil and the aft lifting foil to stabilize the chassis while hydrofoiling; and
an electrical energy storage; and
wherein at least one of the plurality of hydrofoil struts is further configured to dynamically transition to an intermediate state between the deployed state and the stowed state, said intermediate state being where at least one of the forward lifting foil and the aft lifting foil is fixed between its extended position and its retracted position;
wherein at least one of the plurality of hydrofoil struts is further configured to dynamically transition into and out of the chassis;
wherein at least one of the forward lifting foil and the aft lifting foil is located underneath the chassis when in its extended position;
wherein at least one of plurality of hydrofoil struts is configured to rotate from its stowed state, away from the chassis, to its deployed state;
wherein at least one of the at least two water thrusters is configured to steer the personal amphibious vehicle while operating as the watercraft;
wherein the traction drive is electrically driven and is powered by the electrical energy storage;
wherein the traction drive is configured to dynamically transition between a watercraft state and a land travel state, said watercraft state being where at least two of the at least three road wheels are at least partially retracted into the chassis, and said land travel state being where the at least three road wheels are configured to be direct contact with a ground;
wherein the traction drive is further configured to fix the at least two of the at least three road wheels into a plurality of heights from the chassis; and
wherein the at least two water thrusters of the water drive are independently controllable from each other and the water drive is further configured to steer the personal amphibious vehicle in water via outputting a thrust gradient between the at least two water thrusters.

17. An amphibious vehicle comprising:
a chassis including a lower body, an upper portion, a forward portion, an aft portion, and an amphibious vehicle user interface, the chassis configured for land travel and as a watercraft;
a traction drive mounted to the chassis, the traction drive configured to propel, stop, and steer the amphibious vehicle on land;
a water drive mounted to the chassis, the water drive including at least two water thrusters, the water drive configured to propel and steer the amphibious vehicle in water;
a forward lifting foil configured to hydrofoil in water, and to lift the forward portion of the chassis while hydrofoiling;
an aft lifting foil configured to hydrofoil in water, and to lift the aft portion of the chassis while hydrofoiling; and
a plurality of hydrofoil struts each mounted to the chassis and to at least one of the forward lifting foil and the aft lifting foil, the plurality of hydrofoil struts each configured to dynamically between a deployed state and a stowed state, said deployed state being where at least one of the forward lifting foil and the aft lifting foil is positioned in an extended position below the lower body of the chassis, and said stowed state being where the at least one of the forward lifting foil and the aft lifting foil is positioned in a retracted position above the extended position, relative to chassis; and
wherein at least one of the water thrusters of the water drive are configured to exhaust thrust proximate a leading edge of at least one of the forward lifting foil and the aft lifting foil.

18. The amphibious vehicle of claim 17, wherein the traction drive includes at least four road wheels together configured to propel, stop, and steer the personal amphibious vehicle on land.

* * * * *